(12) United States Patent
Forsyth et al.

(10) Patent No.: US 10,957,938 B2
(45) Date of Patent: Mar. 23, 2021

(54) SODIUM-ION ELECTROLYTE COMPOSITION

(71) Applicants: Deakin University, Geelong (AU); Monash University, Clayton (AU)

(72) Inventors: Maria Forsyth, Ashburton (AU); Matthias Hilder, Fitzroy North (AU); Patrick C. Howlett, Box Hill South (AU); Faezeh Makhlooghiazad, Forest Hill (AU); Douglas Robert MacFarlane, East Brighton (AU)

(73) Assignees: Deakin University, Geelong (AU); Monash University, Clayton (AU)

( * ) Notice: Subject to any disclaimer, the term of this patent is extended or adjusted under 35 U.S.C. 154(b) by 113 days.

(21) Appl. No.: 15/780,055

(22) PCT Filed: Nov. 30, 2016

(86) PCT No.: PCT/AU2016/051172
§ 371 (c)(1),
(2) Date: May 30, 2018

(87) PCT Pub. No.: WO2017/091854
PCT Pub. Date: Jun. 8, 2017

(65) Prior Publication Data
US 2018/0358654 A1      Dec. 13, 2018

(30) Foreign Application Priority Data
Nov. 30, 2015  (AU) .................................. 2015904962

(51) Int. Cl.
*H01M 10/0564* (2010.01)
*H01M 10/054* (2010.01)
(Continued)

(52) U.S. Cl.
CPC ........ *H01M 10/0564* (2013.01); *H01G 9/025* (2013.01); *H01G 9/042* (2013.01);
(Continued)

(58) Field of Classification Search
CPC ........... H01M 10/0564; H01M 10/054; H01M 10/0562; H01M 4/364; H01M 4/40;
(Continued)

(56) References Cited

U.S. PATENT DOCUMENTS

2011/0104526 A1    5/2011  Boxley et al.

FOREIGN PATENT DOCUMENTS

JP       2016139461 A  *  8/2016

OTHER PUBLICATIONS

English translation of JP-2016139461-A (Year: 2016).*
(Continued)

*Primary Examiner* — Christopher P Domone
*Assistant Examiner* — Kimberly Wyluda
(74) *Attorney, Agent, or Firm* — Foley Hoag LLP; Alexander Akhiezer; Laura A. Wzorek

(57) ABSTRACT

A sodium-ion electrolyte composition for use in an electrochemical cell, the electrolyte composition comprising a mixture of a phosphonium salt and a sodium salt, wherein the electrolyte composition presents as a solid up to at least 25° C.

16 Claims, 20 Drawing Sheets

(51) Int. Cl.
*H01M 10/0562* (2010.01)
*H01M 4/40* (2006.01)
*H01G 11/62* (2013.01)
*H01G 11/06* (2013.01)
*H01G 11/30* (2013.01)
*H01G 9/025* (2006.01)
*H01G 9/042* (2006.01)
*H01G 9/15* (2006.01)
*H01M 4/36* (2006.01)
*H01M 4/583* (2010.01)
*H01M 4/02* (2006.01)

(52) U.S. Cl.
CPC ............... *H01G 9/15* (2013.01); *H01G 11/06* (2013.01); *H01G 11/30* (2013.01); *H01G 11/62* (2013.01); *H01M 4/364* (2013.01); *H01M 4/40* (2013.01); *H01M 4/583* (2013.01); *H01M 10/054* (2013.01); *H01M 10/0562* (2013.01); *H01M 2004/027* (2013.01); *H01M 2300/0025* (2013.01); *H01M 2300/0065* (2013.01)

(58) Field of Classification Search
CPC ........... H01M 4/583; H01M 2004/027; H01M 2300/0025; H01M 2300/0065; H01G 9/025; H01G 9/042; H01G 9/15; H01G 11/06; H01G 11/30; H01G 11/62
See application file for complete search history.

(56) References Cited

OTHER PUBLICATIONS

Noor, S. A., Yoon, H., Forsyth, M., & Macfarlane, D. R. (2015). Gelled ionic liquid sodium ion conductors for sodium batteries. Electrochimica Acta, 169, 376-381. doi:10.1016/j.electacta.2015.03.024 (Year: 2015).*
Chen et al., "Insights into the Transport of Alkali Metal Ions Doped into a Plastic Crystal Electrolyte," Chemistry of Materials, 27: 2666-2672 (2015).
International Preliminary Report on Patentability for International Application No. PCT/AU2016/051172 dated Feb. 2, 2017.
Jin et al., "An organic ionic plastic crystal electrolyte for rate capability and stability of ambient temperature lithium batteries," Energy & Environmental Science, 7: 3352-3361 (2014).

* cited by examiner a)

b)

SODIUM-ION ELECTROLYTE COMPOSITION

CROSS-REFERENCES TO RELATED APPLICATIONS

This application is the U.S. national stage of International Patent Application No. PCT/AU2016/051172, filed Nov. 30, 2016, which claims the benefit of Australian Patent Application serial number 2015904962, filed Nov. 30, 2015, the contents of both of which are hereby incorporated by reference in their entireties.

FIELD OF THE INVENTION

The invention relates in general to electrolyte compositions. In particular, the invention relates to a sodium-ion electrolyte composition for use in an electrochemical cell and to an electrochemical cell comprising the sodium-ion electrolyte composition.

BACKGROUND OF THE INVENTION

Electrolyte compositions are essential components of electrochemical cells in that they provide the medium through which electrical charge is exchanged between the electrodes of the cell. Being electronically insulating but ionically conductive, electrolyte compositions facilitate the exclusive transfer of positive charges between electrodes by providing a separate and isolated pathway to cations relative to electrons.

The search for effective and efficient electrolyte compositions is therefore essential for the provision of electrochemical cells capable of delivering high current densities in a stable and safe manner.

There are numerous known electrolyte compositions in the art. Amongst those, nitrogen-based ionic liquids (N-ILs) have in the recent years attracted considerable attention due to their high ionic conductivity and low cost. In particular, lithium based N-ILs have been the focus of recent research efforts as alternative electrolytes in existing and ubiquitous lithium-ion cells.

However, concerns about future supply of lithium in view of a growing demand and inconvenient geographical localisation of known lithium mineral deposits have recently contributed to shift the research focus away from lithium-based cells and electrolytes to sodium-based alternatives. Sodium mineral deposits are vast, attainable at low cost, and geographically well distributed. In addition, given a number of similarities between the chemistry and format of lithium and sodium-based cells, there is potential for sodium-based cell technology to retrofit into existing technology used to industrially manufacture lithium-based cells.

Accordingly, a variety of sodium-based N-ILs have been proposed as electrolyte compositions for use in sodium cells. However, inherent drawbacks of proposed electrolyte compositions remain a concern, with commercial applicability being limited by safety issues arising from flammability and high volatility.

An opportunity therefore remains to address or ameliorate one or more disadvantages or shortcomings associated with current electrolyte compositions with a mind to enabling their practical and commercial applicability.

SUMMARY OF THE INVENTION

The present invention therefore provides a sodium-ion electrolyte composition for use in an electrochemical cell, the electrolyte composition comprising a mixture of a phosphonium salt and a sodium salt, wherein the electrolyte composition presents as a solid up to at least 25° C.

The electrolyte composition in accordance with the invention can surprisingly present as a solid up to at least 25° C. and over a wide concentration range of sodium salt while maintaining high ionic conductivity.

By presenting as a solid at temperatures up to at least 25° C., the electrolyte composition of the present invention advantageously presents low volatility. As a result, it is less prone to flammability problems than conventional liquid electrolytes.

In addition, presenting as a solid at temperatures up to at least 25° C. over a wide concentration range of sodium salt, the electrolyte compositions of the present invention advantageously offer high ionic conductivity at lower temperature relative to conventional solid-state electrolytes. As a result, electrochemical cells based on the electrolytes of the present invention can operate at lower temperatures relative to conventional solid-state cells.

For example, conventional solid-state sodium electrochemical cells are based on a solid state ceramic electrolyte and typically operate at high temperatures (~300° C.) to attain a sufficiently high conductivity in the electrolyte. This in turn has limited such cells to use primarily in industrial applications. In contrast, cells that use the electrolyte composition of the present invention can advantageously operate and sustain high current densities over a wider range of temperatures (including room temperature) relative to conventional solid-state sodium cells. This advantageously extends the application of the cells that use the electrolyte composition of the present invention into wider commercial applications.

From a production standpoint, the possibility to achieve high ionic conductivity over a wide range of metal concentrations makes the electrolytes of the present invention easy to manufacture, in that composition tolerances are not strict. This makes the electrolytes of the present invention particularly attractive over, for example, corresponding lithium-based electrolytes. In effect, the latter are known to present as a solid only at lithium concentrations that are either too low or too high to provide for high ionic conductivity. This effectively restricts the range of suitable lithium concentrations providing for practically useful solid-state electrolytes, which therefore require precise manufacturing.

Accordingly, the compositions of the invention advantageously provide for electrochemically stable electrolytes that combine the practical advantages associated to solid electrolytes (e.g. increased safety, ease of manufacturing and handling, and flexible form-factors) with attractive electrolytic characteristics for applications in solid-state electric devices.

In one embodiment, the phosphonium salt is a phosphonium-based organic ionic plastic crystal (OIPC). A characteristic of OIPCs is that they undergo at least one temperature-promoted solid-solid transition within their sub-melting temperature range. As a result, the use of phosphonium-based OIPCs can advantageously provide for electrolyte compositions that, at a given concentration of sodium salt, present as solid at higher temperatures relative to compositions obtained using non-OIPC phosphonium salts.

As a result, the use of OIPCs can allow for electrolyte compositions having high ionic conductivity and that present as a solid also at high temperatures.

Accordingly, the present invention also provides a sodium-ion electrolyte composition for use in an electrochemical cell, the electrolyte composition comprising a mixture of a phosphonium-based OIPC and a sodium salt, wherein the electrolyte composition presents as a solid up to at least 25° C.

The present invention further provides a sodium electrochemical cell comprising a negative electrode and a sodium-ion electrolyte composition according to the invention. Those skilled in the art will appreciate the cell according the present invention will generally comprise at least one other electrode such as a counter electrode or a positive electrode.

In some embodiments, the sodium electrochemical cell of the invention comprises a counter electrode. In such embodiments the cell can be referred to as being in a half-cell configuration and the negative electrode functions as a working electrode. Advantageously, when in a half-cell configuration the cell of the invention can find application as a diagnostic or testing device for positive electrodes. For example, the cell of the invention may be used as a testing device to identify suitable positive electrodes for use in a full-cell configuration.

In some embodiments the sodium electrochemical cell of the invention comprises a positive electrode. In such embodiments the cell can be referred to as being a full-cell configuration. In this configuration, the ability to (i) support high current density at the negative electrode, and (ii) sustain a high number of polarisation or charge/discharge cycles, makes the cells suitable for the production of high capacity and cycle-stable sodium rechargeable batteries.

Accordingly, the present invention also provides a sodium rechargeable battery comprising a negative electrode, a positive electrode, and a sodium-ion electrolyte composition according to the invention.

Further aspects and embodiments of the invention are described in more detail below.

BRIEF DESCRIPTION OF THE DRAWINGS

Embodiments of the invention will be now described with reference to the following non-limiting drawings, in which.

Figure 9:
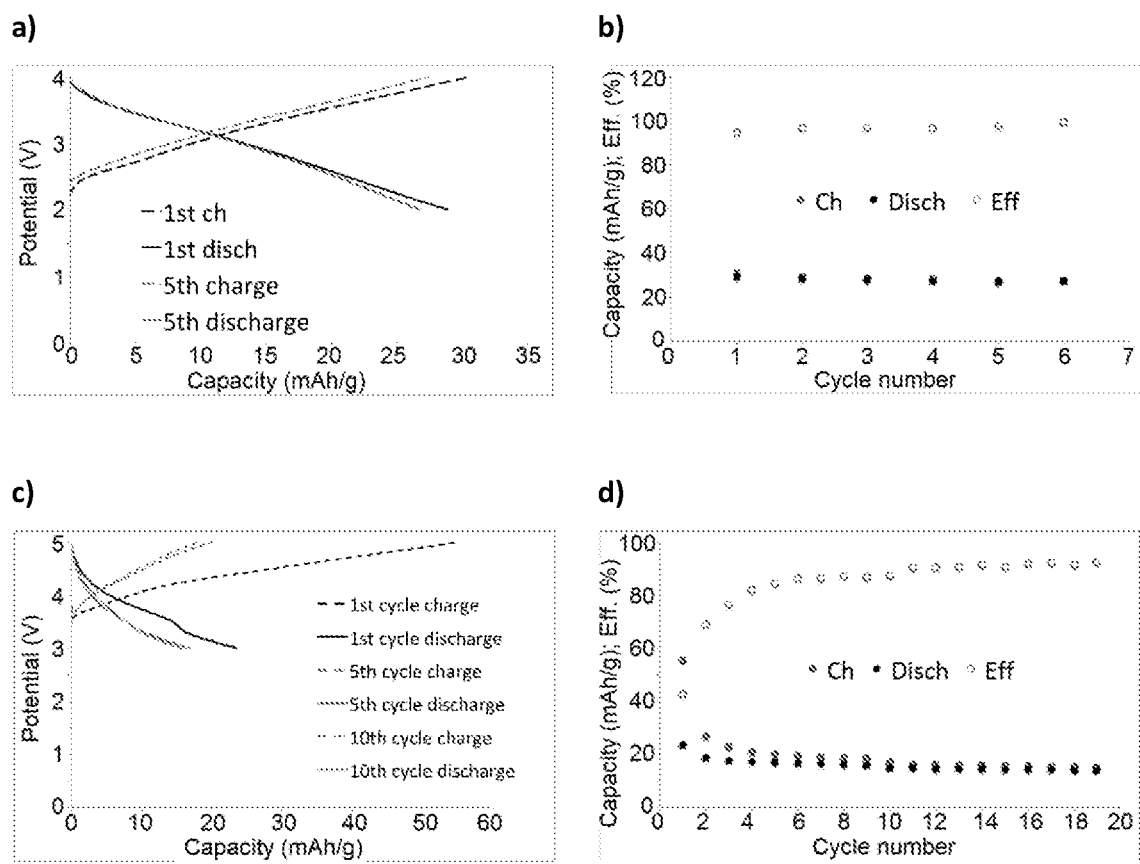
Figure 10:
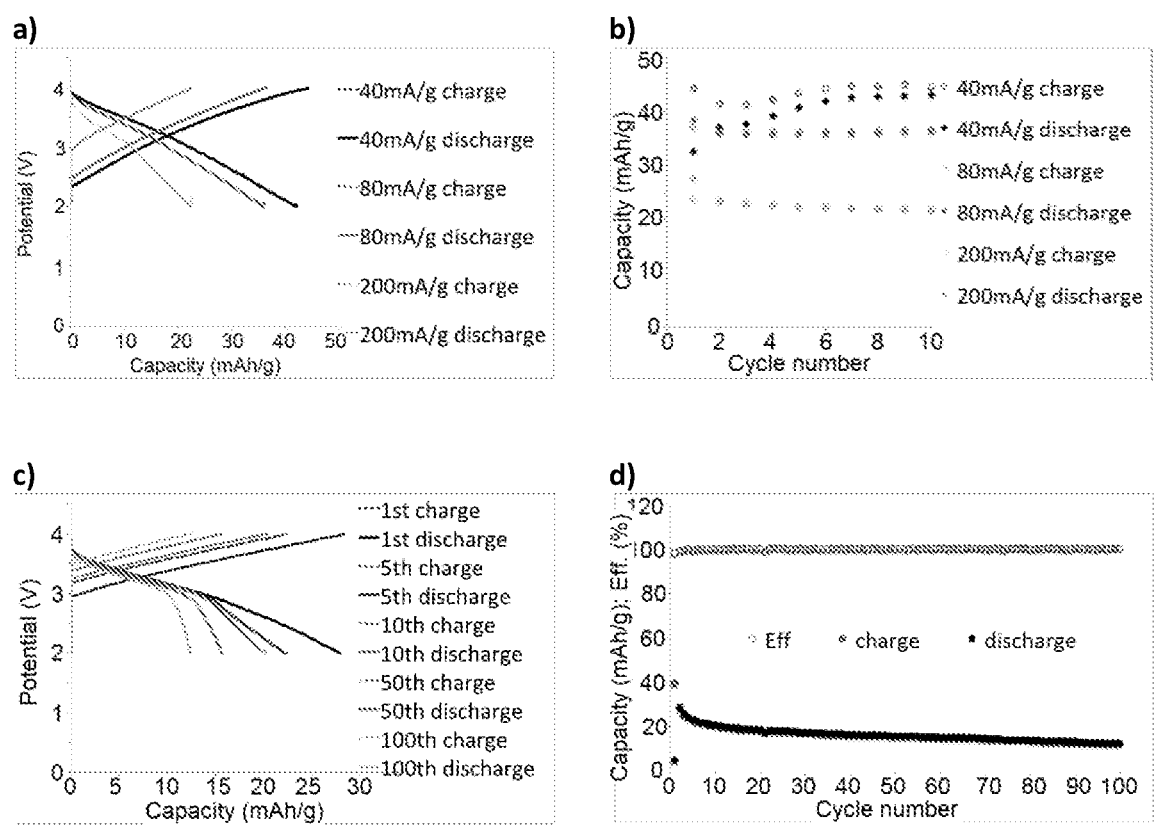
Figure 11:
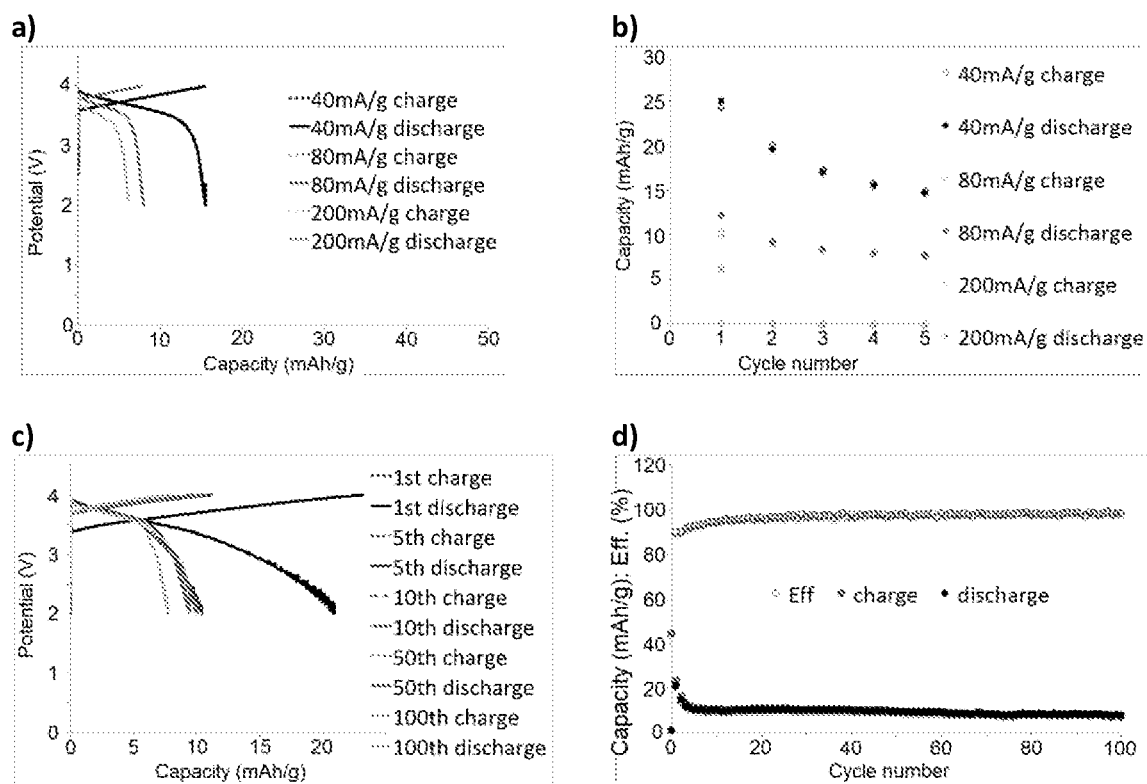
Figure 12:
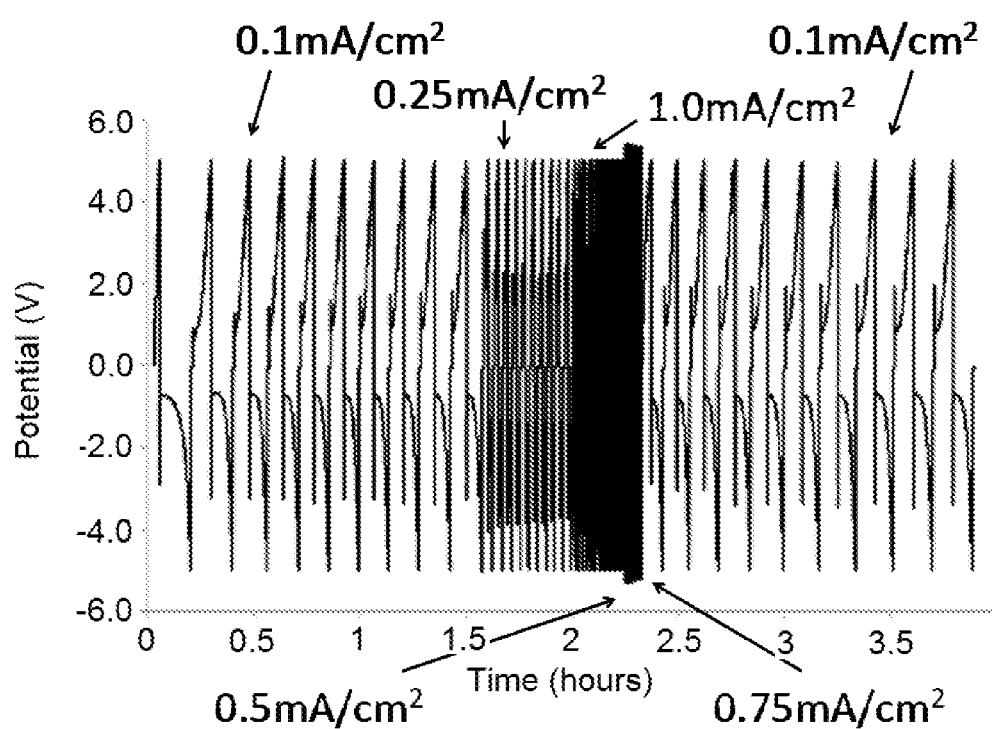
Figure 13:
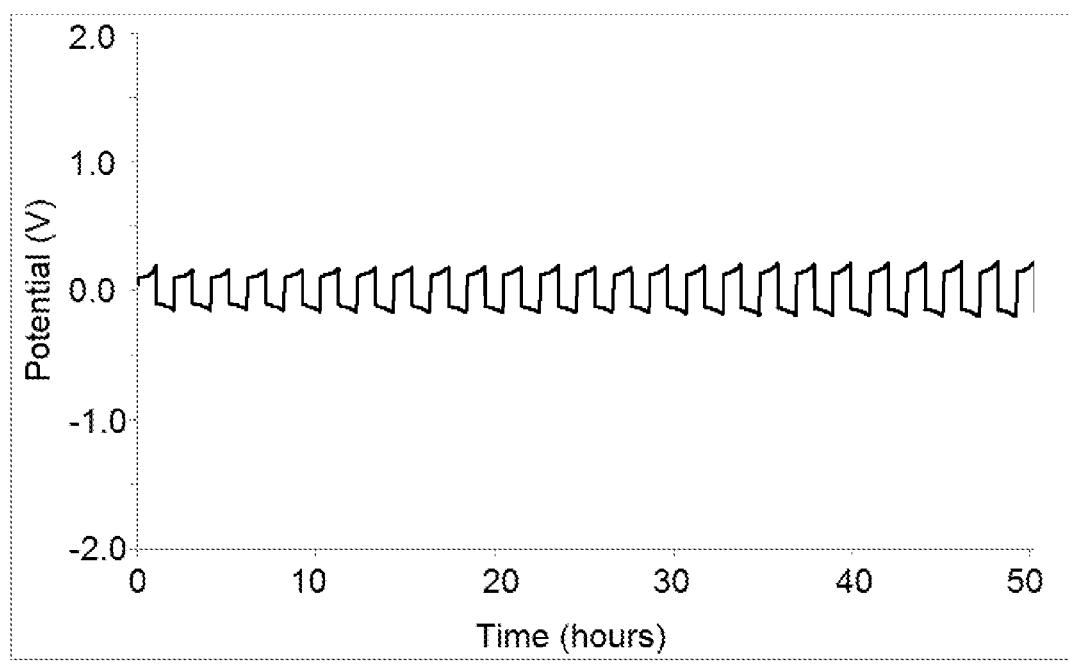
Figure 14:
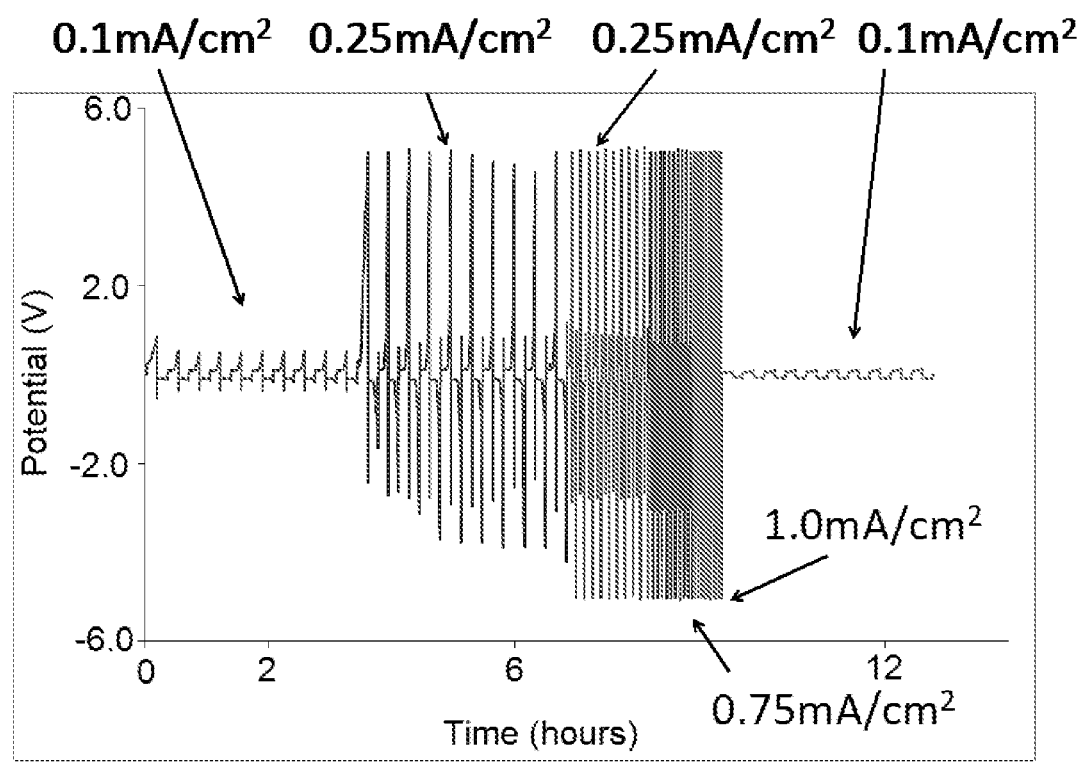
Figure 15:
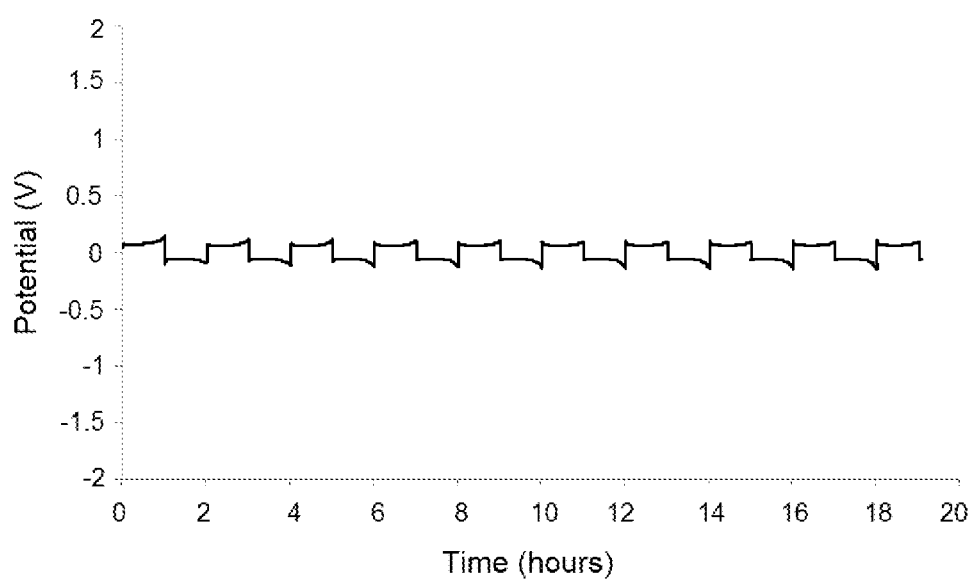
Figure 16:
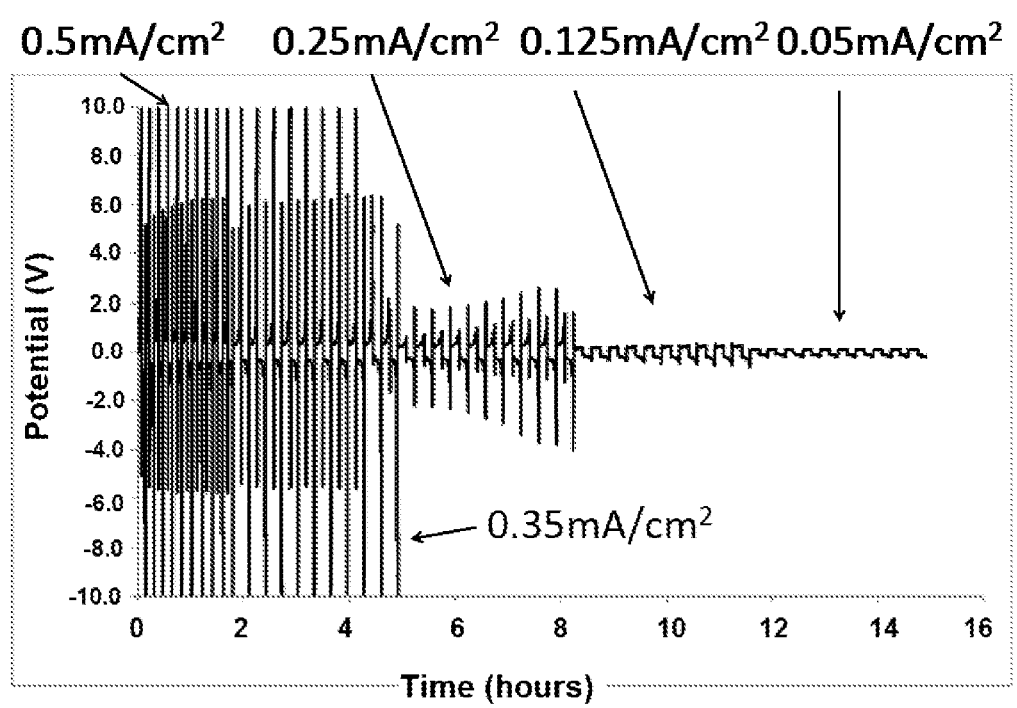
Figure 17:
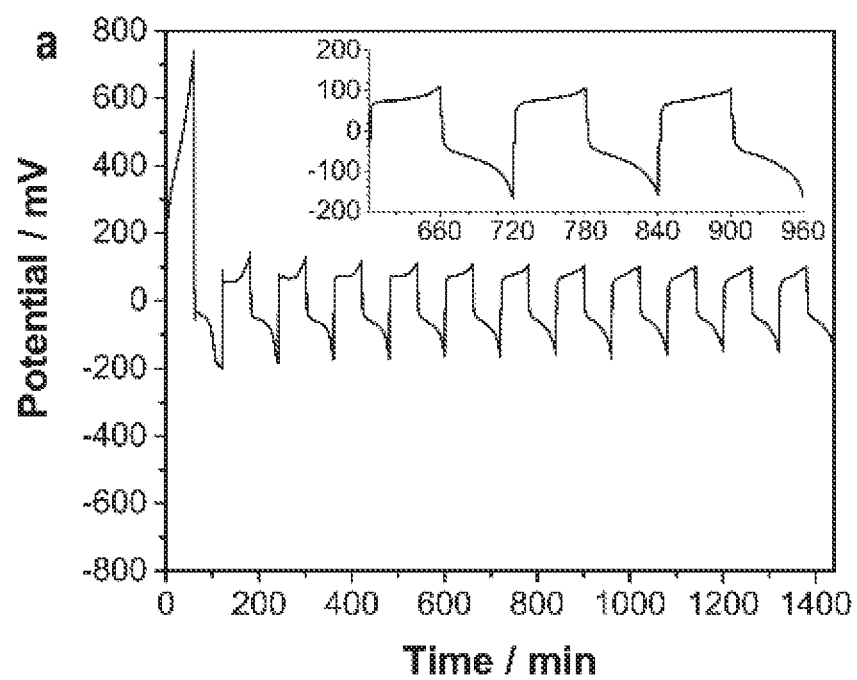
Figure 18:
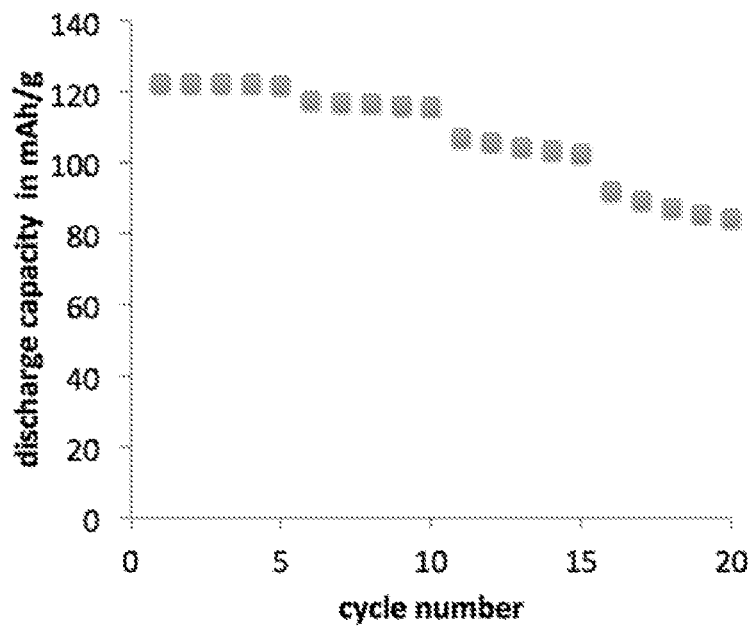
Figure 18:
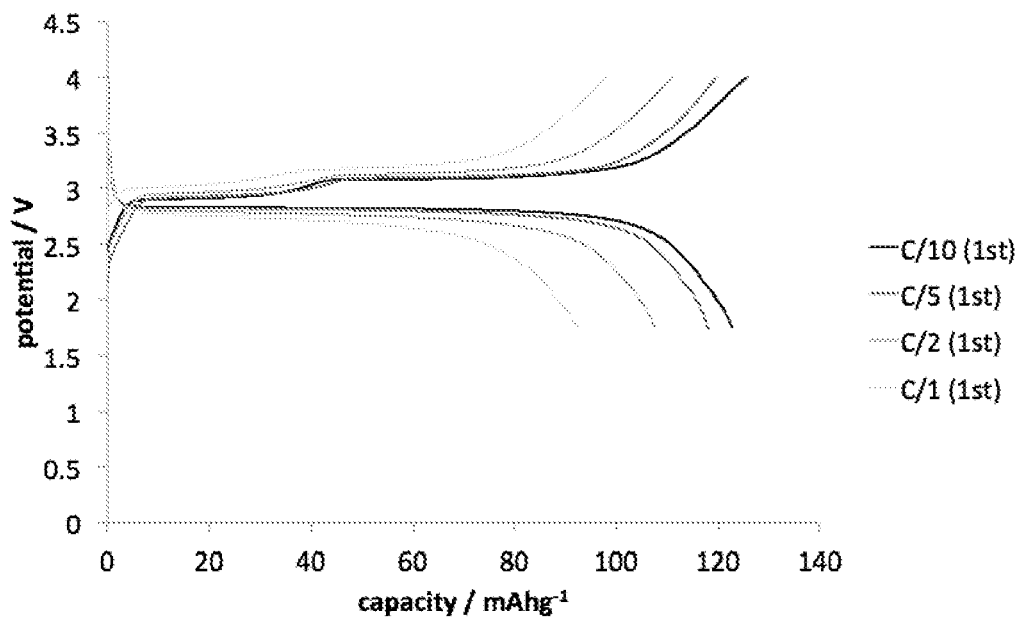
Figure 19:
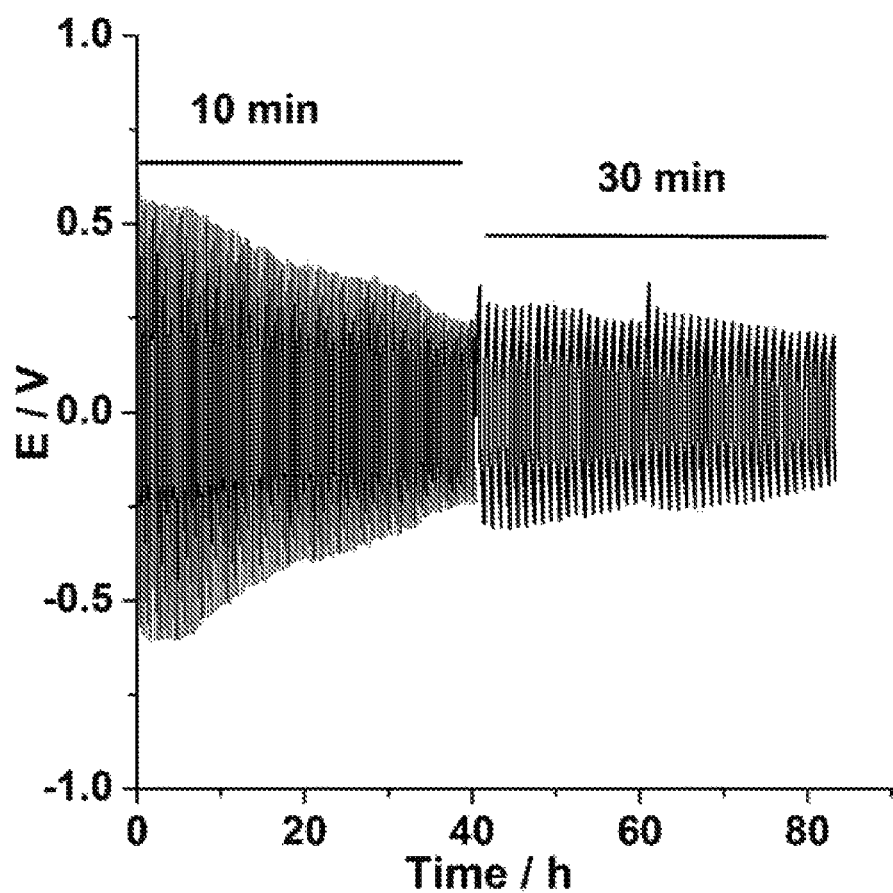
Figure 20:
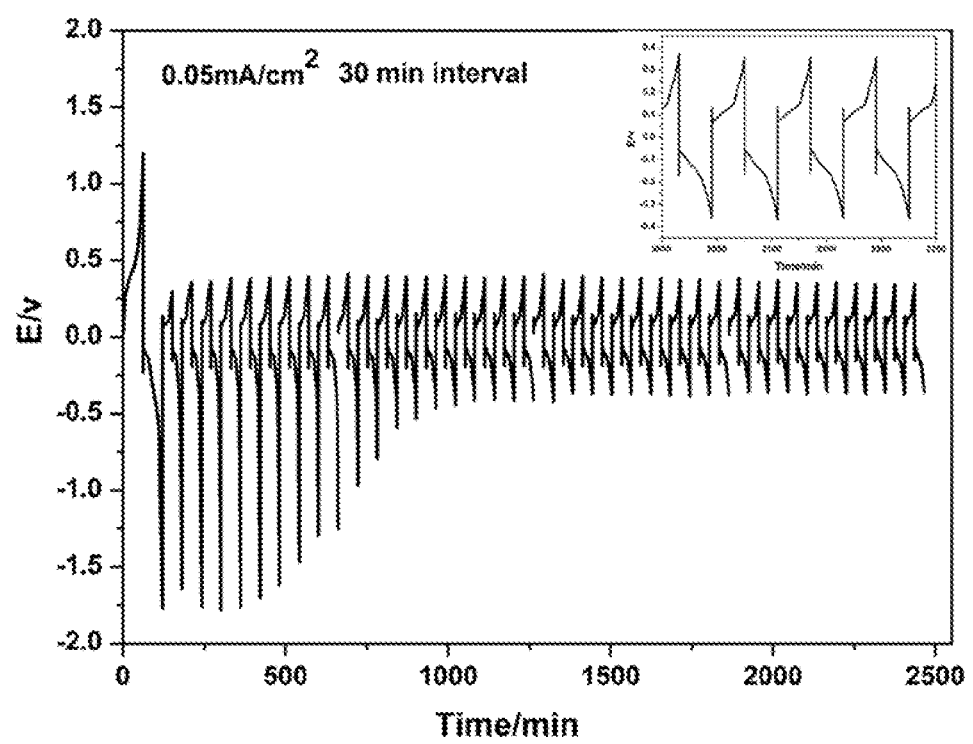

(a) 25 mol %, 25° C., polarisation steps of 7 min (4-177 $\mu A/cm^2$); (b) 25 mol %, 50° C., polarisation steps of 7 min (4-177 $\mu A/cm^2$); (c) 25 mol %, 25° C., varied applied currents of (10-1000 $\mu A/cm^2$ as labelled) and step duration adjusted to give 0.004 mAh or remain within the instrument voltage polarisation limits of ±5V;

FIG. 9 shows electrochemical cycling data measured on a hybrid cell (full-cell configuration, sodium as negative electrode and carbon capacitor as positive electrode) using a $P_{111i4}$[TFSI]/Na[TFSI] electrolyte composition with sodium concentration of 50 mol %, at 25° C.; (a) cell voltage profile and (b) charge/discharge capacity and % efficiency vs. cycle number, 50 mol %, 25° C., 2-4V, 17 mA/g; (c) cell voltage profile and (d) charge/discharge capacity and % efficiency vs. cycle number, 50 mol %, 25° C., 3-5V, 17 mA/g (long term);

FIG. 10 shows electrochemical cycling data measured on a hybrid cell (full-cell configuration, sodium as negative electrode and carbon capacitor as positive electrode) using a $P_{111i4}$[TFSI]/Na[TFSI] electrolyte composition with sodium concentration of 50 mol %, at 50° C. cycled between 2-4V; (a) cell voltage profile and (b) charge/discharge capacity and % efficiency vs. cycle number, (40, 80 and 200 mA/g); (c) cell voltage profile and (d) charge/discharge capacity and % efficiency vs. cycle number, (long term cycling at 80 mA/g);

FIG. 11 shows current cycling data measured on a hybrid cell (full-cell configuration, sodium as negative electrode and carbon capacitor as positive electrode) using a $P_{111i4}$[TFSI]/Na[TFSI] electrolyte composition with sodium concentration of 75 mol %, at 50° C. cycled between 2-4V; (a) cell voltage profile and (b) charge/discharge capacity and % efficiency vs. cycle number, (40, 80 and 200 mA/g) (c) cell voltage profile and (d) charge/discharge capacity and % efficiency vs. cycle number, (long term cycling at 40 mA/g);

FIG. 12 shows electrochemical cycling data measured on a sodium symmetric cell (sodium electrodes) using a methyl-triisobutyl-phosphonium bis(trifluoromethylsulfonyl)amide (or $P_{1i444}$[FSI]) mixed with Na[FSI] electrolyte composition with sodium concentration of 90 mol %, cycled at 25° C. at current densities of 0.1 to 1 mA/cm² (10 min cycles or within the instrument voltage polarisation limits of ±5V);

FIG. 13 shows electrochemical cycling data measured on a sodium symmetric cell (sodium electrodes) using a $P_{1i444}$[FSI]/Na[FSI] electrolyte composition with sodium concentration of 90 mol %, cycled at 25° C. at a current density of 0.1 mA/cm² (1 h polarisation steps);

FIG. 14 shows current cycling data measured on a sodium symmetric cell (sodium electrodes) using a $P_{1i444}$[FSI]/Na[FSI] electrolyte composition with sodium concentration of 90 mol %, cycled at 50° C. at different current densities of 0.1 to 1 mA/cm² (12 min polarisation steps or within the instrument voltage polarisation limits of ±5V);

FIG. 15 shows electrochemical cycling of a sodium symmetric cell (sodium electrodes) using a $P_{1i444}$[FSI]/Na[FSI] electrolyte composition with sodium concentration of 90 mol %, measured at 50° C. with current densities of 0.01 mA/cm² (1 h polarisation steps);

FIG. 16 shows electrochemical cycling data measured on a sodium symmetric cell (sodium electrodes) using a $P_{1i444}$[FSI]/Na[FSI] electrolyte composition with sodium concentration of 90 mol %, cycled at 25° C. at different current densities starting at high currents of 0.5 to 0.05 mA/cm² (10 min polarisation steps or within the instrument voltage polarisation limits of ±5V);

FIG. 17 shows sodium metal plating and stripping data measured on a sodium symmetrical cell (sodium electrodes)

using a $P_{1i444}$[FSI]/Na[FSI] electrolyte composition with sodium concentration of 45 mol % (Na[FSI]), and comprising a polyethylene separator. The data was obtained at 0.5 mA cm$^{-2}$ for 1 h polarization over 12 cycles;

FIG. 18 shows cycling data of a sodium ion cell using sodium metal as an anode, NaFePO$_4$ (NFP) as cathode and a $P_{1i444}$[FSI]/Na[FSI] electrolyte composition with sodium concentration of 45 mol %. The cells were cycled for 5 times at 50° C. at current rates of C/10, C/5, C/2 and C/1 using voltage cut off limits of 1.75-4.0V. a) discharge capacities at C/10 (cycle 1-5), C/5 (cycle 6-10), C/2 (cycle 11-15), C/1 (cycle 16-20), b) voltage capacity profile at C/10, C/5, C/2 and C/1 (1$^{st}$ cycle shown);

FIG. 19 shows galvanostatic cycling at 23° C. of a sodium symmetric cell (sodium electrodes) using a $P_{1i444}$FSI/Na[PF$_6$] electrolyte composition with sodium concentration of 20 mol %. The data was measured using a current density of 0.1 mAcm$^{-2}$, at 10 and 30 minutes intervals; and FIG. 20 shows galvanostatic cycling data relative to a sodium symmetrical cell using a $P_{1i444}$[TFSI]/Na[TFSI] electrolyte composition with sodium concentration of 50 mol %, cycling at 0.05 mAcm$^{-2}$ for 30 min at 50° C.

Some Figures contain colour representations or entities. Coloured versions of the Figures are available upon request.

DETAILED DESCRIPTION OF THE INVENTION

The sodium-ion electrolyte composition according to the present invention comprises a mixture of a phosphonium salt and a sodium salt.

By the expression 'phosphonium salt' is meant a salt made up of a phosphonium cation and a counter anion. By the expression 'phosphonium cation' is meant a cation containing phosphorous and having a positive charge, and by the expression 'counter anion' is meant a negatively charged ion that is associated with the phosphonium cation to provide for charge neutrality of the resulting phosphonium salt.

There is no particular limitation as to the chemical nature and physical state of the phosphonium salt that can be employed, provided the mixture of phosphonium and sodium salts produce an electrolyte composition that presents as a solid up to at least 25° C.

For example, the phosphonium salt may be a liquid at 25° C. and, once mixed with the sodium salt, it provides for a composition that presents as a solid up to at least 25° C.

In one embodiment, the phosphonium salt comprises a phosphonium cation of general formula [PR$_3$R$^1$]$^+$, where each R is the same or different and independently selected from optionally substituted alkyl and optionally substituted aryl, or where one R group is selected from optionally substituted alkyl and optionally substituted aryl and the remaining two R groups together with P form an optionally substituted heterocyclic ring, and R$^1$ is selected from H, optionally substituted alkyl, and optionally substituted aryl.

Examples of suitable phosphonium cations include tetra (C$_{1-20}$ alkyl) phosphonium, tri(C$_{1-9}$ alkyl) mono(C$_{10-20}$ alkyl) phosphonium, tetra(C$_{6-24}$ aryl) phosphonium, phospholanium, phosphinanium and phosphorinanium.

The phosphonium salt comprises a counter anion. Provided the requirements of the invention are met, there is no particular limitation on the type of counter anion that can be used. Examples of suitable counter anions include BF$_4^-$, PF$_6^-$, N(CN)$_2^-$, (CF$_3$SO$_2$)$_2$N$^-$, (FSO$_2$)$_2$N$^-$, OCN$^-$, SCN$^-$, dicyanomethanide, carbamoyl cyano(nitroso)methanide, (C$_2$F$_5$SO$_2$)$_2$N$^-$, (CF$_3$SO$_2$)$_3$C$^-$, C(CN)$_3^-$, B(CN)$_4^-$, (C$_2$F$_5$)$_3$ PF$_3^-$, alkyl-SO$_3^-$, perfluoroalkyl-SO$_3^-$, aryl-SO$_3^-$, I$^-$, H$_2$PO$_4^-$, HPO$_4^{2-}$, sulfate, sulphite, nitrate, trifluoromethanesulfonate, p-toluenesulfonate, bis(oxalate)borate, acetate, formate, gallate, glycolate, BF$_3$(CN)$^-$, BF$_2$(CN)$_2^-$, BF(CN)$_3^-$, BF$_3$(R)$^-$, BF$_2$(R)$_2^-$, BF(R)$_3^-$ where R is an alkyl group (for example methyl, ethyl, propyl), cyclic sulfonyl amides, bis (salicylate)borate, perfluoroalkyltrifluoroborate, chloride, bromide, and transition metal complex anions (for example [Tb(hexafluoroacetylacetonate)$_4$]).

In one embodiment the phosphonium salt is a phosphonium-based organic ionic plastic crystal (OIPC). The expression 'phosphonium-based organic ionic plastic crystal' used herein is intended to mean a salt that (i) contains a phosphonium cation and a counter anion, (ii) is a plastic crystal and (iii) has ionic conductivity of at least 10$^{-9}$ S/cm when in its sub-melting phase.

It has now been found that use of phosphonium-based OIPC salts can advantageously enhance the solid characteristics of the electrolyte compositions according to the invention. Without wishing to be limited by theory, it is believed that upon being subjected to an increase in temperature a phosphonium-based OIPC salt can undergo an increase in entropy via a solid-solid phase transition. This is in contrast with non-OIPC phosphonium salts which, upon being subjected to an increase in temperature, would typically undergo an increase in entropy via a solid-liquid phase transition.

The ability of the phosphonium-based OIPC salt to undergo an increase in entropy via a solid-solid phase transition is believed to in effect extend the temperature range over which the electrolyte compositions according to the invention can exhibit solid characteristics at a given concentration of sodium salt. Most notably, use of phosphonium-based OIPC salts can advantageously provide for electrolyte compositions having high ionic conductivity and that present as a solid over an extended temperature range.

In the context of being a 'phosphonium-based organic ionic plastic crystal', the expression 'plastic crystal' is meant to indicate that the phosphonium-based OIPC displays at least one temperature-driven solid-solid phase transition before melting. In some cases this phase transitions may be difficult to observe or the lower temperature phase may be difficult to form. In those cases, the plastic crystal properties can be indicated by the ionic conductivity of the material in its sub-melting phase.

By the expression 'solid-solid phase transition' is meant a temperature promoted rearrangement of the crystal lattice structure and/or a rearrangement of the constituent ion molecular structures, or parts of the molecular structure, of the phosphonium-based OIPC. In the art, different solid phases of an OIPC are also referred to as 'rotator phases', and the solid-solid phase transition of an OIPC is accordingly referred to as 'rotator phase transition'. Those transitions are associated with a temperature promoted onset of rotational or translational motions of the ions (or parts of the ions) resulting in a progressive transformation of the salt structure from a first lattice arrangement to a second arrangement. The second arrangement is characterised by increased disorder, for example rotational disorder whereby all or part of the ion is in rotational motion. When in a plastic phase, an OIPC is more mechanically plastic.

A person skilled in the art would be aware of techniques that can be adopted to measure and characterise a solid-solid phase transition of a phosphonium-based OIPC. For the purpose of this application the technique of choice is Differential Scanning calorimetry (DSC). As it would be known to the skilled person, DSC characterisation is typically performed by linearly scanning the sample temperature through a range of values and allows a plot to be obtained of the heat flow into or out of the phosphonium-based OIPC versus a reference sample. From this, the heat capacity, transition temperatures, transition enthalpy and entropy and melting point of the phosphonium-based OIPC can also be determined.

In general, a DSC plot allows visualising phase transitions of a material in the form of a discontinuity of the heat flow, versus a reference, at specific temperatures, for example in the form of a spike in the heat flow signal. Accordingly, for the purpose of this application a solid-solid phase transition of the phosphonium-based OIPC is characterised by a DSC plot in which a discontinuity (e.g. a spike) of the heat flow in the sub-melting temperature range is observed. For avoidance of doubt, such discontinuity will be in addition to, and distinct from, the discontinuity arising from the solid-liquid transition of the phosphonium-based OIPC (i.e. melting).

In the context of being a 'phosphonium-based organic ionic plastic crystal', the expression 'ionic conductivity of at least $10^{-9}$ S/cm when in sub-melting phase' refers to the value of ionic conductivity that is determined by Electrochemical Impedance Spectroscopy (EIS) according to the following procedure. The phosphonium-based OIPC is first shaped into a pellet (nominally 1 mm thick and 13 mm in diameter) under dry conditions, then sandwiched between two stainless steel blocking electrodes that are locked together and hermetically sealed. The ionic conductivity is measured by EIS using a frequency response analyzer driven by an impedance measurement software (which would be available to a skilled person). Data is collected over a 10 MHz to 0.1 Hz frequency range and at a temperature at which the phosphonium-based OIPC is solid and in the sub-melting phase. The temperature of the cell is controlled using a high accuracy temperature controller (with accuracy better than ±1° C.), with the temperature measured using a thermocouple in close proximity to the blocking electrodes. The sample is heated (typically at <0.5° C./min) and thermally equilibrated (typically for 5-20 minutes) prior to impedance measurement at each temperature point. For avoidance of doubt, those skilled in the art would be capable to practically devise the appropriate conditions of heating rate and thermal equilibration duration based on the physical consistency of the sample material. For example, OIPCs of soft consistency undergoing wire-based EIS measurements, where the quantity of sample is much larger, will need longer thermal equilibration stages (e.g. up to 20 minutes) while for OIPCs with firmer consistency undergoing plate-based EIS measurements, with smaller quantity of material, a shorter thermal equilibration step (down to 5 minutes) will be sufficient.

Provided the combination a given cation and counter anion results in a phosphonium-based OIPC that (i) contains a phosphonium cation and a counter anion, (ii) is a plastic crystal and (iii) has ionic conductivity of at least $10^{-9}$ S/cm when in its sub-melting phase, there is no particular limitation on the type of phosphonium cation and associated counter anion that can be employed.

Examples of suitable phosphonium-based OIPCs for use in the invention include diethyl(methyl)(isobutyl)phosphonium bis(fluorosulfonyl)amide, diethyl(methyl)(isobutyl) phosphonium tetrafluoroborate, diethyl(methyl)(isobutyl) phosphonium hexafluorophosphate, methy(triethyl) phosphonium bis(fluorosulfonyl)amide, methyl(triethyl) phosphonium bis(trifluoromethylsulfonyl)amide, triisobutyl (methyl)phosphonium hexafluorophosphate, triisobutyl (methyl)phosphonium bis(fluorosulfonyl)amide, triisobutyl (methyl)phosphonium tetrafluoroborate, triisobutyl(methyl) phosphonium thiocyanate, triethyl(methyl)phosphonium bis (fluorosulfonyl)imide, tri(isobutyl)phosphonium bis(trifluoromethanesulfonyl)amide, tri(isobutyl)phosphonium methanesulfonate, tri(isobutyl)phosphonium trifluoro-methanesulfonate, tri(isobutyl)phosphonium nitrate, and combinations thereof.

The sodium electrolyte composition of the present invention also comprises a sodium salt. The sodium salt is present in the form of a mixture with the phosphonium salt.

By the composition comprising a 'mixture' of a phosphonium salt and a sodium salt is meant that the composition is in a form of an intimate blend of its constituents. It will be understood that such blend may be homogenous or heterogeneous depending on factors such as the nature of the constituents, their relative amount and the temperature.

By being 'homogeneous', the blend will be understood as having the same chemical and physical properties throughout its entire volume. This includes, for example, instances in which the mixture is in the form a solid solution of the constituents, as well as instances in which the mixture is in the form of an ionic compound having a distinct crystallographic structure relative to that of the constituents. By being 'heterogeneous', the blend will be understood as presenting discrete chemical and/or physical properties throughout its volume. This includes, for example, instances in which the mixture presents multiple phases which may be discrete solid phases, or solid-liquid phases in which the solid phase may itself be a solid-solution.

Provided the electrolyte composition of the invention presents as a solid up to at least 25° C., there is no particular limitation as to the nature of the sodium salt that can be used.

A common characteristic of sodium salts suitable for use in the electrolyte composition of the invention is that of having an anion that can be referred to as possessing a 'globular' structure. By having a 'globular' structure it is meant that the anion has a configurational shape presenting spherical symmetry around its center by rotation around an axis. A further characteristic of the anion of sodium salts suitable for use in the electrolyte composition of the invention is that of possessing a diffuse or mobile negative charge which is able to reside or average across the anion structure.

Examples of sodium salts for use in the composition of the invention include sodium bis(trifluoromethanesulfonyl)imide (Na[TFSI]), sodium (bis(fluorosulfonyl)imide (Na [FSI]), sodium triflate (NaOTf), sodium perchlorate (NaClO$_4$), sodium dicyanamide (NaDCA), sodium cyanate (NaOCN) sodium tetrafluoroborate (NaBF$_4$), sodium hexafluorophosphate (NaPF$_6$), and combinations thereof.

Those skilled in the art will be able to select a suitable combination of a phosphonium salt and sodium salt providing for a composition that presents as a solid up to at least 25° C.

By the electrolyte composition presenting 'as a solid' up to at least 25° C. it is meant that the electrolyte composition as a whole up to at least 25° C. is characterised by sufficient structural rigidity to support its own weight and maintain its shape in the absence of external factors such as constrictions (e.g. a container) or applied forces. Provided the electrolyte composition presents as a solid, a fraction of the electrolyte composition may nevertheless be in the liquid phase.

In some embodiments, the electrolyte composition of the invention presents as a solid up to at least 30° C., at least 40° C., at least 50° C., at least 60° C., at least 70° C., at least 80° C., at least 90° C., at least 100° C., at least 110° C., at least 120° C., at least 130° C., at least 140° C., at least 150° C., at least 160° C., at least 170° C., at least 180° C., at least 190° C., at least 200° C., at least 210° C., at least 220° C., at least 230° C., at least 240° C., or at least 250° C. In some embodiments, the electrolyte composition of the invention presents as a solid up to a temperature of at least 300° C. or at least 350° C.

In some embodiments, the electrolyte composition of the invention is solid throughout the entire composition. By the electrolyte composition being 'solid throughout the entire composition' is meant that the entire volume of the electrolyte composition is in the solid state.

Accordingly, in some embodiments the electrolyte composition of the invention is solid throughout the entire composition up to at least 30° C., at least 40° C., at least 50° C., at least 60° C., at least 70° C., at least 80° C., at least 90° C., at least 100° C., at least 110° C., at least 120° C., at least 130° C., at least 140° C., at least 150° C., at least 160° C., at least 170° C., at least 180° C., at least 190° C., at least 200° C., at least 210° C., at least 220° C., at least 230° C., at least 240° C., or at least 250° C. In some embodiments, the electrolyte composition of the invention is solid throughout the entire composition up to a temperature of at least 300° C. or at least 350° C.

In other embodiments, a fraction of the electrolyte composition of the invention is in the liquid phase. There is no limitation as to the extent of the fraction of electrolyte composition that is in the liquid phase, provided the electrolyte composition presents as a solid up to at least 25° C. Those skilled in the art would be capable to determine suitable values of volume fraction that is in the liquid phase for a given electrolyte composition on the basis of the phase diagram of the specific composition.

The presence of a fractional volume of liquid within the volume of the electrolyte composition advantageously provides for electrolyte compositions having higher ionic conductivity relative to conventional solid-state electrolytes. Without wishing to be limited by theory, it is believed that the fractional volume of liquid within the electrolyte composition facilitates the mobility of charges within the composition by providing preferential pathways for the transfer of sodium ions through the volume of the electrolyte composition.

In some embodiments, the temperature at which the electrolyte composition of the invention may present a volume fraction which is in the liquid phase is up to at least 30° C., at least 40° C., at least 50° C., at least 60° C., at least 70° C., at least 80° C., at least 90° C., at least 100° C., at least 110° C., at least 120° C., at least 130° C., at least 140° C., at least 150° C., at least 160° C., at least 170° C., at least 180° C., at least 190° C., at least 200° C., at least 210° C., at least 220° C., at least 230° C., at least 240° C., at least 250° C., at least 300° C., or at least 350° C.

The electrolyte composition of the invention can advantageously present as a solid up to at least 25° C. over a wide range of sodium concentrations.

There is no particular limitation as to the sodium concentration in the electrolyte composition of the invention, provided the electrolyte composition presents as a solid up to 25° C. In some embodiments, sodium is present at a concentration of at least 10 mol %, at least 15 mol %, at least 20 mol %, at least 25 mol %, at least 30 mol %, at least 35 mol %, at least 40 mol %, at least 45 mol %, at least 50 mol %, at least 55 mol %, at least 60 mol %, at least 65 mol %, at least 70 mol %, at least 75 mol %, at least 80 mol %, at least 85 mol %, at least 90 mol %, or at least 95 mol %, relative to the total moles of phosphonium salt and sodium salt combined.

In some embodiments, sodium is present at a concentration of between about 10 mol % and about 95 mol %, between about 15 mol % and about 95 mol %, between about 20 mol % and about 95 mol %, between about 30 mol % and about 95 mol %, between about 35 mol % and about 95 mol %, between about 40 mol % and about 95 mol %, between about 45 mol % and about 95 mol %, between about 50 mol % and about 95 mol %, between about 55 mol % and about 95 mol %, between about 60 mol % and about 95 mol %, between about 65 mol % and about 95 mol %, between about 70 mol % and about 95 mol %, between about 75 mol % and about 95 mol %, between about 80 mol % and about 95 mol %, or between about 85 mol % and about 95 mol %, relative to the total moles of phosphonium salt and sodium salt combined.

In other embodiments, sodium is present at a concentration of between about 10 mol % and about 85 mol %, between about 15 mol % and about 85 mol %, between about 20 mol % and about 85 mol %, between about 30 mol % and about 85 mol %, between about 35 mol % and about 85 mol %, between about 40 mol % and about 85 mol %, between about 45 mol % and about 85 mol %, between about 50 mol % and about 85 mol %, between about 55 mol % and about 85 mol %, between about 60 mol % and about 85 mol %, between about 65 mol % and about 85 mol %, between about 70 mol % and about 85 mol %, between about 75 mol % and about 85 mol %, or between about 80 mol % and about 85 mol %, relative to the total moles of phosphonium salt and sodium salt combined.

In other embodiments, sodium is present at a concentration of between about 10 mol % and about 75 mol %, between about 15 mol % and about 75 mol %, between about 20 mol % and about 75 mol %, between about 30 mol % and about 75 mol %, between about 35 mol % and about 75 mol %, between about 40 mol % and about 75 mol %, between about 45 mol % and about 75 mol %, between about 50 mol % and about 75 mol %, between about 55 mol % and about 75 mol %, between about 60 mol % and about 75 mol %, between about 65 mol % and about 75 mol %, or between about 70 mol % and about 75 mol %, relative to the total moles of phosphonium salt and sodium salt combined.

The electrolyte composition of the invention can have ionic conductivity of at least $10^{-9}$ S/cm when in sub-melting phase. In some embodiments, the ionic conductivity of the electrolyte composition is at least $10^{-9}$ S/cm, at least $10^{-8}$ S/cm, at least $10^{-7}$ S/cm, at least $10^{-6}$ S/cm, at least $10^{-5}$ S/cm, at least $10^{4}$ S/cm, at least $10^{-3}$ S/cm, at least $10^{-2}$ S/cm, at least $10^{-1}$ S/cm.

The present invention also provides a sodium electrochemical cell comprising a negative electrode and a sodium-ion electrolyte composition as described herein.

As used herein, the expression 'sodium electrochemical cell' is intended to mean a cell that converts chemical energy to electrical energy or converts electrical energy to chemical energy based on the specific interaction between sodium ions and the negative electrode. Examples of such interactions include chemical oxidation/reduction, intercalation and alloying-dealloying. As it is understood in the art, these specific interactions also involve collective migration of electrons within the negative electrode, which can therefore generate electric current in an external electric circuit connected to the negative electrode.

In the context of the present invention, the term 'intercalation' used herein refers to the reversible insertion of sodium ions into the host lattice of an electrode, for example between atomic layers inherently present in the lattice structure of the electrode or into interstitial locations existing within the lattice structure of the electrode.

As used herein, the expression 'oxidation/reduction' refers to chemical reactions in which atoms (including atoms other than sodium) have their oxidation state changed as a result of an electron transfer between species. In this context, 'oxidation/reduction' embraces a reversible change of the oxidation state of sodium as well as a change of the oxidation state of a species forming the electrode material that accompanies an interaction (e.g. absorption/desorption) between the electrode and sodium ions.

In the context of the present invention, the expression 'alloying/dealloying' used herein indicates a mechanism providing for the reversible and intimate amalgamation of sodium ions within the atomic structure of the electrode.

As used herein, and as a person skilled in the art would know, the expression 'negative electrode' refers to the electrode at which electrons leave the cell during discharge as a consequence of an interaction between the electrode and the sodium ions of the kind described herein. By reference to its functionality during discharge, the negative electrode is also commonly referred to in the art as an 'anode'.

A negative electrode of the cell according to the invention is not limited to any particular electrode material, provided that when in electrical contact with the sodium-ion electrolyte composition of the invention it allows for the specific interaction between sodium ions and the negative electrode as described herein.

Accordingly, the negative electrode may comprise (or be made of) materials that can reversibly intercalate sodium ions within their atomic structure, interact with sodium ions (e.g. absorption/desorption) by promoting reversible oxidation/reduction reactions, or promote alloying/dealloying reactions with sodium.

The expressions 'negative electrode may comprise' and 'negative electrode may be made of' are intended to be a reference the composition of the negative electrode per se, absent the electrolyte composition.

Examples of material which the negative electrode may comprise (or be made of) include expanded graphite, hard carbon (non-graphitisable carbon), low potential transition-metal oxides and phosphates such as NASICON-type $NaTi_2(PO_4)_3$, vanadates such as vanadium layered oxides (e.g. $O_3$—$NaVO_2$ and $P_2$—$Na_{0.7}VO_2$), titanates such as $Na_2Ti_3O_7$, $NaTi_3O_6(OH).2H_2O$, $Na_2Ti_6O_{13}$, $TiNb_2O_7$, $Na_{0.66}Li_{0.22}Ti_{0.78}O_2$, $Na_{0.6}Ni_{0.3}Ti_{0.7}O_2$ and titanates/carbon black composites, alloying materials such as antimony, tin, phosphorus and their combinations (e.g. Sn—Sb alloys), tin-based composites such as tin powder/resin (e.g. polyacrylate), microcrystalline antimony-based composites such as microcrystalline antimony-black carbon electrodes, amorphous phosphorus, sodium (including solid sodium), and combinations thereof.

In some embodiments, the negative electrode comprises sodium. In other embodiments, the negative electrode consists essentially of sodium. In yet other embodiments, the negative electrode comprises sodium metal. In yet other embodiments, the negative electrode consists essentially of sodium metal. In some embodiments, the sodium metal is in a solid state. Again, this is in the context of the composition of the negative electrode per se, absent electrolyte material.

In other embodiments, the negative electrode comprises sodium and carbon. For convenience, an electrode comprising sodium and carbon will herein also be referred to as an electrode comprising a 'sodium/carbon composite'.

Other examples of material which the negative electrode may comprise (or be made of) include those disclosed in Dipan Kundu, Elahe Talaie, Victor Duffort, and Linda F. Nazar, *The Emerging Chemistry of Sodium Ion Batteries for Electrochemical Energy Storage*, Angewandte Chemie Int. Ed. 2015, volume 54, pages 3431; Veronica Palomares, Paula Serras, Irune Villaluenga, Karina B. Hueso, Javier Carretero-Gonzalez, and Teofilo Rojo, *Na-ion batteries, recent advances and present challenges to become low cost energy storage systems*, Energy & Environmental Science 2012, volume 5, page 5884; Gebrekidan Gebresilassie Eshetu, Michel Armand, Bruno Scrosati, and Stefano Passerini, *Energy Storage Materials Synthesized from Ionic Liquids* Angewandte Chemie Int. Ed. 2014, volume 53, page 13342; N. Yabuuchi, K. Kubota, M. Dahbi, and S. Komaba, *Chemical Review* 2014, volume 114, page 11636, the contents of which are included herein in their entirety.

In some embodiments, the sodium electrochemical cell of the invention supports a current density at the negative electrode of at least 10 $\mu A/cm^2$, at least 50 $\mu A/cm^2$, at least 100 $\mu A/cm^2$, at least 200 $\mu A/cm^2$, at least 300 $\mu A/cm^2$, at least 400 $\mu A/cm^2$, at least 500 $\mu A/cm^2$, at least 600 $\mu A/cm^2$, at least 700 $\mu A/cm^2$, at least 800 $\mu A/cm^2$, at least 900 $\mu A/cm^2$, at least 1,000 $\mu A/cm^2$, at least 1,100 $\mu A/cm^2$, at least 1,200 $\mu A/cm^2$, at least 1,300 $\mu A/cm^2$, at least 1,400 $\mu A/cm^2$, at least 1,500 $\mu A/cm^2$, at least 1,600 $\mu A/cm^2$, at least 1,700 $\mu A/cm^2$, at least 1,800 $\mu A/cm^2$, at least 1,900 $\mu A/cm^2$, or at least 2,000 $\mu A/cm^2$.

In some embodiments, the sodium electrochemical cell of the invention supports a current density at the negative electrode up to 2,500 $\mu A/cm^2$.

In some embodiments, the sodium electrochemical cell of the invention supports a current density at the negative electrode of from 10 $\mu A/cm^2$ to 2,500 $\mu A/cm^2$, of from 50 $\mu A/cm^2$ to 2,500 $\mu A/cm^2$, of from 100 $\mu A/cm^2$ to 2,500 $\mu A/cm^2$, of from 200 $\mu A/cm^2$ to 2,500 $\mu A/cm^2$, of from 300 $\mu A/cm^2$ to 2,500 $\mu A/cm^2$, of from 400 $\mu A/cm^2$ to 2,500 $\mu A/cm^2$, of from 500 $\mu A/cm^2$ to 2,500 $\mu A/cm^2$, of from 600 $\mu A/cm^2$ to 2,500 $\mu A/cm^2$, of from 700 $\mu A/cm^2$ to 2,500 $\mu A/cm^2$, of from 800 $\mu A/cm^2$ to 2,500 $\mu A/cm^2$, of from 900 $\mu A/cm^2$ to 2,500 $\mu A/cm^2$, of from 1,000 $\mu A/cm^2$ to 2,500 $\mu A/cm^2$, of from 1,100 $\mu A/cm^2$ to 2,500 $\mu A/cm^2$, of from 1,200 $\mu A/cm^2$ to 2,500 $\mu A/cm^2$, of from 1,300 $\mu A/cm^2$ to 2,500 $\mu A/cm^2$, of from 1,400 $\mu A/cm^2$ to 2,500 $\mu A/cm^2$, of from 1,500 $\mu A/cm^2$ to 2,500 $\mu A/cm^2$, of from 1,600 $\mu A/cm^2$ to 2,500 $\mu A/cm^2$, of from 1,700 $\mu A/cm^2$ to 2,500 $\mu A/cm^2$, of from 1,800 $\mu A/cm^2$ to 2,500 $\mu A/cm^2$, of from 1,900 $\mu A/cm^2$ to 2,500 $\mu A/cm^2$, or of from 2000 $\mu A/cm^2$ to 2,500 $\mu A/cm^2$.

In some embodiments, the sodium electrochemical cell of the invention supports a current density at the negative electrode of from 10 $\mu A/cm^2$ to 2,000 $\mu A/cm^2$, of from 50 $\mu A/cm^2$ to 2,000 $\mu A/cm^2$, of from 100 $\mu A/cm^2$ to 2,000 $\mu A/cm^2$, of from 200 $\mu A/cm^2$ to 2,000 $\mu A/cm^2$, of from 300 $\mu A/cm^2$ to 2,000 $\mu A/cm^2$, of from 400 $\mu A/cm^2$ to 2,000 $\mu A/cm^2$, of from $\mu A/cm^2$ 500 $\mu A/cm^2$ to 2,000 $\mu A/cm^2$, of from 600 $\mu A/cm^2$ to 2,000 $\mu A/cm^2$, of from 700 $\mu A/cm^2$ to 2,000 $\mu A/cm^2$, of from 800 $\mu A/cm^2$ to 2,000 $\mu A/cm^2$, of from 900 $\mu A/cm^2$ to 2,000 $\mu A/cm^2$, of from 1,000 $\mu A/cm^2$ to 2,000 $\mu A/cm^2$, of from 1,100 $\mu A/cm^2$ to 2,000 $\mu A/cm^2$, of from 1,200 $\mu A/cm^2$ to 2,000 $\mu A/cm^2$, of from 1,300 $\mu A/cm^2$ to 2,000 $\mu A/cm^2$, of from 1,400 $\mu A/cm^2$ to 2,000 $\mu A/cm^2$, of from 1,500 $\mu A/cm^2$ to 2,000 $\mu A/cm^2$, of from 1,600 $\mu A/cm^2$ to 2,000 $\mu A/cm^2$, of from 1,700 $\mu A/cm^2$ to 2,000 $\mu A/cm^2$, of from 1,800 $\mu A/cm^2$ to 2,000 $\mu A/cm^2$, or of from 1,900 $\mu A/cm^2$ to 2,000 $\mu A/cm^2$.

In some embodiments, the sodium electrochemical cell of the invention supports a current density at the negative electrode of from 10 $\mu A/cm^2$ to 1,500 $\mu A/cm^2$, of from 50 $\mu A/cm^2$ to 1,500 $\mu A/cm^2$, of from 100 $\mu A/cm^2$ to 1,500 $\mu A/cm^2$, of from 200 $\mu A/cm^2$ to 1,500 $\mu A/cm^2$, of from 300 $\mu A/cm^2$ to 1,500 $\mu A/cm^2$, of from 400 $\mu A/cm^2$ to 1,500 $\mu A/cm^2$, 500 $\mu A/cm^2$ to 1,500 $\mu A/cm^2$, of from 600 $\mu A/cm^2$ to 1,500 µA/cm², of from 700 µA/cm² to 1,500 µA/cm², of from 800 µA/cm² to 1,500 µA/cm², of from 900 µA/cm² to 1,500 µA/cm², of from 1,000 µA/cm² to 1,500 µA/cm², of from 1,100 µA/cm² to 1,500 µA/cm², of from 1,200 µA/cm² to 1,500 µA/cm², of from 1,300 µA/cm² to 1,500 µA/cm², or of from 1,400 µA/cm² to 1,500 µA/cm².

By specifying that the cell 'supports' a certain current density at the negative electrode is meant the cell per se attains that current density characteristic during a state in which electric current is flowing through the negative electrode. As known in the art, such intrinsic characteristics of an electrochemical cell are typically referenced in the context of the cell during its operation. However, by specifying the cell per se attains that characteristic is not intended to be a limitation to the cell in use. Provided the cell can attain the characteristic, the cell will of course 'support' that characteristic whether or not in use.

In other words, certain embodiments of the cell of the invention relate to sodium electrochemical cells that are capable of supporting a current density at the negative electrode of at least 10 µA/cm².

In this context, reference to the cell that 'supports' or is 'capable of supporting' a certain current density at the negative electrode is meant that when in a state in which electric current is flowing through the negative electrode the cell allows that certain current density to flow through the negative electrode without compromising the electrochemical integrity of the cell.

Accordingly, expressions such as the cell "supports" or is "capable of supporting" a current density at the negative electrode of at least 10 µA/cm²' relate to the ability of the cell per se to attain the current density characteristic when, for example, the cell is connected to an external electrical component or portion of an electric circuit that provides or consumes electric power, such as a power supply or an electric load. Those skilled in the art could readily seek out suitable power supplies or electric loads that would generate, when connected to the cell of the invention, electric current flowing through the negative electrode.

A cell according to the invention will of course support the current density characteristic when in use.

As used herein, the expression 'current density at the negative electrode' means the current density at the negative electrode that results from the reversible Na⁺/Na oxidation/reduction reaction. Those skilled in the art would be able to determine whether the current density generated at the negative electrode results from Na⁺/Na oxidation/reduction reaction (as opposed to other sources of current, e.g. corrosion) if the measured current density results in sustained and consistent cell voltage over at least ten one-minute polarisation cycles.

The cell according to the invention may be configured and used such that electric current flows through the negative electrode along opposite directions in a cyclical manner. This may be achieved by subjecting the cell to polarisation cycles, in which electric current of a certain density flows through the negative electrode along alternating opposite directions. As a result, an electric potential of alternating sign can be observed.

In this context, a single polarisation cycle is intended to mean a two-step cycle comprising: step 1 in which electric current of a certain density flows through the negative electrode along an initial direction; and step 2 in which the electric current is switched to flow through the negative electrode along the direction opposite to the initial direction.

In some embodiments, the cell according to the invention can advantageously undergo such polarisation cycles while still maintaining a current density at the negative electrode of at least 10 µA/cm². As a skilled person would understand, a cell undergoing polarisation cycles at a certain current density may also be referred to as being capable of 'sustaining' such current density.

There is no particular limitation as to the duration of each polarisation cycle, provided it results in a charge transfer of at least 0.005 mAh/cm².

In some embodiments, the duration of each polarisation cycle is such that it provides for a charge transfer of a least about 0.005 mAh/cm², at least about 0.01 mAh/cm², at least about 0.02 mAh/cm², at least about 0.05 mAh/cm², at least about 0.1 mAh/cm², at least about 0.2 mAh/cm², at least about 0.5 mAh/cm², at least about 1 mAh/cm², at least about 2 mAh/cm², at least about 3 mAh/cm², at least about 4 mAh/cm², at least about 5 mAh/cm², or at least about 6 mAh/cm².

In some embodiments, the duration of each polarisation cycle is such that it provides for a charge transfer of between about 0.005 mAh/cm² and about 8 mAh/cm², of between about 0.01 mAh/cm² and about 8 mAh/cm², of between about 0.02 mAh/cm² and about 8 mAh/cm², of between about 0.05 mAh/cm² and about 8 mAh/cm², of between about 0.1 mAh/cm² and about 8 mAh/cm², of between about 0.2 mAh/cm² and about 8 mAh/cm², of between about 0.5 mAh/cm² and about 8 mAh/cm², of between about 1 mAh/cm² and about 8 mAh/cm², of between about 2 mAh/cm² and about 8 mAh/cm², of between about 3 mAh/cm² and about 8 mAh/cm², of between about 4 mAh/cm² and about 8 mAh/cm², of between about 5 mAh/cm² and about 8 mAh/cm², of between about 6 mAh/cm² and about 8 mAh/cm².

In some embodiments, the duration of each polarisation cycle is such that it provides for a charge transfer of between about 0.005 mAh/cm² and about 4 mAh/cm², of between about 0.01 mAh/cm² and about 4 mAh/cm², of between about 0.02 mAh/cm² and about 4 mAh/cm², of between about 0.05 mAh/cm² and about 4 mAh/cm², of between about 0.1 mAh/cm² and about 4 mAh/cm², of between about 0.2 mAh/cm² and about 4 mAh/cm², of between about 0.5 mAh/cm² and about 4 mAh/cm², of between about 1 mAh/cm² and about 4 mAh/cm², of between about 2 mAh/cm² and about 4 mAh/cm², or of between about 3 mAh/cm² and about 4 mAh/cm².

In some embodiments, the duration of each polarisation cycle is such that it provides for a charge transfer of between about 0.005 mAh/cm² and about 1 mAh/cm², of between about 0.01 mAh/cm² and about 1 mAh/cm², of between about 0.02 mAh/cm² and about 1 mAh/cm², of between about 0.05 mAh/cm² and about 1 mAh/cm², of between about 0.1 mAh/cm² and about 1 mAh/cm², of between about 0.2 mAh/cm² and about 1 mAh/cm², or of between about 0.5 mAh/cm² and about 1 mAh/cm².

In some embodiments, the duration of each polarisation cycle is such that it provides for a charge transfer of between about 0.005 mAh/cm² and about 0.5 mAh/cm², of between about 0.01 mAh/cm² and about 0.5 mAh/cm², of between about 0.02 mAh/cm² and about 0.5 mAh/cm², of between about 0.05 mAh/cm² and about 0.5 mAh/cm², of between about 0.1 mAh/cm² and about 0.5 mAh/cm², or of between about 0.2 mAh/cm² and about 0.5 mAh/cm².

In some embodiments the sodium electrochemical cell of the invention supports a current density at the negative electrode of at least 10 µA/cm² for at least 10 polarisation cycles, or of at least 10 µA/cm² for at least 20 polarisation cycles, or of at least 10 µA/cm² for at least 50 polarisation cycles, or of at least 10 µA/cm² for at least 100 polarisation cycles, or of at least 10 µA/cm² for at least 500 polarisation cycles, or of at least 10 µA/cm² for at least 1,000 polarisation cycles.

In some embodiments the sodium electrochemical cell of the invention is supports a current density at the negative electrode of at least 50 µA/cm² for at least 10 polarisation cycles, or of at least 50 µA/cm² for at least 20 polarisation cycles, or of at least 50 µA/cm² for at least 50 polarisation cycles, or of at least 50 µA/cm² for at least 100 polarisation cycles, or of at least 50 µA/cm² for at least 500 polarisation cycles, or of at least 50 µA/cm² for at least 1,000 polarisation cycles.

In some embodiments the sodium electrochemical cell of the invention is supports a current density at the negative electrode of at least 100 µA/cm² for at least 10 polarisation cycles, or of at least 100 µA/cm² for at least 20 polarisation cycles, or of at least 100 µA/cm² for at least 50 polarisation cycles, or of at least 100 µA/cm² for at least 100 polarisation cycles, or of at least 100 µA/cm² for at least 500 polarisation cycles, or of at least 100 µA/cm² for at least 1,000 polarisation cycles.

In some embodiments the sodium electrochemical cell of the invention is supports a current density at the negative electrode of at least 200 µA/cm² for at least 10 polarisation cycles, or of at least 200 µA/cm² for at least 20 polarisation cycles, or of at least 200 µA/cm² for at least 50 polarisation cycles, or of at least 200 µA/cm² for at least 100 polarisation cycles, or of at least 200 µA/cm² for at least 500 polarisation cycles, or of at least 200 µA/cm² for at least 1,000 polarisation cycles.

In some embodiments the sodium electrochemical cell of the invention is supports a current density at the negative electrode of at least 300 µA/cm² for at least 10 polarisation cycles, or of at least 300 µA/cm² for at least 20 polarisation cycles, or of at least 300 µA/cm² for at least 50 polarisation cycles, or of at least 300 µA/cm² for at least 100 polarisation cycles, or of at least 300 µA/cm² for at least 500 polarisation cycles, or of at least 300 µA/cm² for at least 1,000 polarisation cycles.

In some embodiments the sodium electrochemical cell of the invention is supports a current density at the negative electrode of at least 400 µA/cm² for at least 10 polarisation cycles, or of at least 400 µA/cm² for at least 20 polarisation cycles, or of at least 400 µA/cm² for at least 50 polarisation cycles, or of at least 400 µA/cm² for at least 100 polarisation cycles, or of at least 400 µA/cm² for at least 500 polarisation cycles, or of at least 400 µA/cm² for at least 1,000 polarisation cycles.

In other embodiments the electrochemical cell is supports a current density at the negative electrode of at least 500 µA/cm² for at least 10 polarisation cycles, or of at least 500 µA/cm² for at least 20 polarisation cycles, or of at least 500 µA/cm² for at least 50 polarisation cycles, or of at least 500 µA/cm² for at least 100 polarisation cycles, or of at least 500 µA/cm² for at least 500 polarisation cycles, or of at least 500 µA/cm² for at least 1,000 polarisation cycles.

In some embodiments the sodium electrochemical cell of the invention supports a current density at the negative electrode of at least 750 µA/cm² for at least 10 polarisation cycles, or of at least 750 µA/cm² for at least 20 polarisation cycles, or of at least 750 µA/cm² for at least 50 polarisation cycles, or of at least 750 µA/cm² for at least 100 polarisation cycles, or of at least 750 µA/cm² for at least 500 polarisation cycles, or of at least 750 µA/cm² for at least 1,000 polarisation cycles.

In other embodiments the sodium electrochemical cell of the invention supports a current density at the negative electrode of at least 1,000 µA/cm² for at least 10 polarisation cycles, or of at least 1,000 µA/cm² for at least 20 polarisation cycles, or of at least 1,000 µA/cm² for at least 50 polarisation cycles, or of at least 1,000 µA/cm² for at least 100 polarisation cycles, or of at least 1,000 µA/cm² for at least 500 polarisation cycles, or of at least 1,000 µA/cm² for at least 1,000 polarisation cycles.

In some embodiments the sodium electrochemical cell of the invention supports a current density at the negative electrode of at least 1,500 µA/cm² for at least 10 polarisation cycles, or of at least 1,500 µA/cm² for at least 20 polarisation cycles, or of at least 1,500 µA/cm² for at least 50 polarisation cycles, or of at least 1,500 µA/cm² for at least 100 polarisation cycles, or of at least 1,500 µA/cm² for at least 500 polarisation cycles, or of at least 1,500 µA/cm² for at least 1,000 polarisation cycles.

In some embodiments the sodium electrochemical cell of the invention supports a current density at the negative electrode of at least 2,000 µA/cm² for at least 10 polarisation cycles, or of at least 2,000 µA/cm² for at least 20 polarisation cycles, or of at least 2,000 µA/cm² for at least 50 polarisation cycles, or of at least 2,000 µA/cm² for at least 100 polarisation cycles, or of at least 2,000 µA/cm² for at least 500 polarisation cycles, or of at least 2,000 µA/cm² for at least 1,000 polarisation cycles.

In other embodiments, when the cell is in use electric current flows through the negative electrode along opposite directions in a cyclical manner as a result of the cell undergoing a charge/discharge cycle. A skilled person will know the technical meaning of the expression 'charge/discharge cycle', and how to perform such procedure.

For example, a charge/discharge cycle may be the charge/discharge performed to activate a rechargeable battery following assembly. As a skilled person would know, this refers to the procedure adopted to form/activate a negative electrode by way of charging/discharging routines under controlled voltage, temperature and environmental conditions, which is performed with the intention of inducing formation of the solid-electrolyte interphase (SEI) layer at the negative electrode.

Accordingly, in some embodiments the sodium electrochemical cell of the invention, when undergoing a charge/discharge cycle, has a current density at the negative electrode of at least 10 µA/cm².

In some embodiments, the sodium electrochemical cell of the invention, when undergoing a charge/discharge cycle, has a current density at the negative electrode of at least 10 µA/cm² for at least 10 charge/discharge cycles, or of at least 10 µA/cm² for at least 20 charge/discharge cycles, or of at least 10 µA/cm² for at least 50 charge/discharge cycles, or of at least 10 µA/cm² for at least 100 charge/discharge cycles, or of at least 10 µA/cm² for at least 500 charge/discharge cycles, or of at least 10 µA/cm² for at least 1,000 charge/discharge cycles.

In some embodiments, the sodium electrochemical cell of the invention, when undergoing a charge/discharge cycle, has a current density at the negative electrode of at least 50 µA/cm² for at least 10 charge/discharge cycles, or of at least 50 µA/cm² for at least 20 charge/discharge cycles, or of at least 50 µA/cm² for at least 50 charge/discharge cycles, or of at least 50 µA/cm² for at least 100 charge/discharge cycles, or of at least 50 µA/cm² for at least 500 charge/discharge cycles, or of at least 50 µA/cm² for at least 1,000 charge/discharge cycles.

In some embodiments, the sodium electrochemical cell of the invention, when undergoing a charge/discharge cycle, has a current density at the negative electrode of at least 100

μA/cm² for at least 10 charge/discharge cycles, or of at least 100 μA/cm² for at least 20 charge/discharge cycles, or of at least 100 μA/cm² for at least 50 charge/discharge cycles, or of at least 100 μA/cm² for at least 100 charge/discharge cycles, or of at least 100 μA/cm² for at least 500 charge/discharge cycles, or of at least 100 μA/cm² for at least 1,000 charge/discharge cycles.

In some embodiments, the sodium electrochemical cell of the invention, when undergoing a charge/discharge cycle, has a current density at the negative electrode of at least 200 μA/cm² for at least 10 charge/discharge cycles, or of at least 200 μA/cm² for at least 20 charge/discharge cycles, or of at least 200 μA/cm² for at least 50 charge/discharge cycles, or of at least 200 μA/cm² for at least 100 charge/discharge cycles, or of at least 200 μA/cm² for at least 500 charge/discharge cycles, or of at least 200 μA/cm² for at least 1,000 charge/discharge cycles.

In some embodiments, the sodium electrochemical cell of the invention, when undergoing a charge/discharge cycle, has a current density at the negative electrode of at least 300 μA/cm² for at least 10 charge/discharge cycles, or of at least 300 μA/cm² for at least 20 charge/discharge cycles, or of at least 300 μA/cm² for at least 50 charge/discharge cycles, or of at least 300 μA/cm² for at least 100 charge/discharge cycles, or of at least 300 μA/cm² for at least 500 charge/discharge cycles, or of at least 300 μA/cm² for at least 1,000 charge/discharge cycles.

In some embodiments, the sodium electrochemical cell of the invention, when undergoing a charge/discharge cycle, has a current density at the negative electrode of at least 400 μA/cm² for at least 10 charge/discharge cycles, or of at least 400 μA/cm² for at least 20 charge/discharge cycles, or of at least 400 μA/cm² for at least 50 charge/discharge cycles, or of at least 400 μA/cm² for at least 100 charge/discharge cycles, or of at least 400 μA/cm² for at least 500 charge/discharge cycles, or of at least 400 μA/cm² for at least 1,000 charge/discharge cycles.

In some embodiments, the sodium electrochemical cell of the invention, when undergoing a charge/discharge cycle, has a current density at the negative electrode of at least 500 μA/cm² for at least 10 charge/discharge cycles, or of at least 500 μA/cm² for at least 20 charge/discharge cycles, or of at least 500 μA/cm² for at least 50 charge/discharge cycles, or of at least 500 μA/cm² for at least 100 charge/discharge cycles, or of at least 500 μA/cm² for at least 500 charge/discharge cycles, or of at least 500 μA/cm² for at least 1,000 charge/discharge cycles.

In other embodiments, the sodium electrochemical cell of the invention, when undergoing a charge/discharge cycle, has a current density at the negative electrode of at least 750 μA/cm² for at least 10 charge/discharge cycles, or of at least 750 μA/cm² for at least 20 charge/discharge cycles, or of at least 750 μA/cm² for at least 50 charge/discharge cycles, or of at least 750 μA/cm² for at least 100 charge/discharge cycles, or of at least 750 μA/cm² for at least 500 charge/discharge cycles, or of at least 750 μA/cm² for at least 1,000 charge/discharge cycles.

In some embodiments, the sodium electrochemical cell of the invention, when undergoing a charge/discharge cycle, has a current density at the negative electrode of at least 1,000 μA/cm² for at least 10 charge/discharge cycles, or of at least 1,000 μA/cm² for at least 20 charge/discharge cycles, or of at least 1,000 μA/cm² for at least 50 charge/discharge cycles, or of at least 1,000 μA/cm² for at least 100 charge/discharge cycles, or of at least 1,000 μA/cm² for at least 500 charge/discharge cycles, or of at least 1,000 μA/cm² for at least 1,000 charge/discharge cycles.

In other embodiments, the sodium electrochemical cell of the invention, when undergoing a charge/discharge cycle, has a current density at the negative electrode of at least 1,500 μA/cm² for at least 10 charge/discharge cycles, or of at least 1,500 μA/cm² for at least 20 charge/discharge cycles, or of at least 1,500 μA/cm² for at least 50 charge/discharge cycles, or of at least 1,500 μA/cm² for at least 100 charge/discharge cycles, or of at least 1,500 μA/cm² for at least 500 charge/discharge cycles, or of at least 1,500 μA/cm² for at least 1,000 charge/discharge cycles.

In some embodiments, the sodium electrochemical cell of the invention, when undergoing a charge/discharge cycle, has a current density at the negative electrode of at least 2,000 μA/cm² for at least 10 charge/discharge cycles, or of at least 2,000 μA/cm² for at least 20 charge/discharge cycles, or of at least 2,000 μA/cm² for at least 50 charge/discharge cycles, or of at least 2,000 μA/cm² for at least 100 charge/discharge cycles, or of at least 2,000 μA/cm² for at least 500 charge/discharge cycles, or of at least 2,000 μA/cm² for at least 1,000 charge/discharge cycles.

Advantageously, the cell according to the invention operates with an electrolyte composition which presents as a solid at room temperature. As used herein, the expression 'room temperature' will be understood as encompassing a range of temperatures between about 20° C. and about 25° C., with an average of about 23° C.

Provided the electrolyte composition presents as a solid up to 25° C., there is no limitation as to the temperature at which the cell of the invention operates. In some embodiments, the cell according to the invention is capable of operating at temperatures between −20° C. and 250° C., for example between −10° C. and 200° C., between 0° C. and 200° C., between 0° C. and 150° C., between 0° C. and 125° C., between 0° C. and 100° C., between 0° C. and 75° C., between 0° C. and 50° C., or between 0° C. and 25° C.

In some embodiments, the sodium electrochemical cell of the invention comprises a counter electrode. In these embodiments the cell of the invention may be referred to as being in a half-cell configuration.

As used herein, the expression 'half-cell configuration' refers to a cell configuration in which the electrodes support a small potential difference (e.g. less than about 1V) during polarisation and from which electrical charge can only be extracted during discharge to a negative cell voltage.

As a skilled person would understand, a half-cell configuration includes cells in a 2-electrode, 3-electrode configurations and higher number of electrode configurations. When in a half-cell configuration, the cell of the invention may be suitable for use as a diagnostic or test device. For example, when in a half-cell configuration the cell of the invention can assist with measuring the electrochemical characteristics of the electrolyte, or with identifying suitable positive electrodes for use in a full cell configuration according to the invention.

In some embodiments, the sodium electrochemical cell of the invention comprises a positive electrode. In these embodiments the cell may be referred to as being in a full-cell configuration. As used herein, the expression 'full-cell configuration' refers to a cell configuration in which the positive and negative electrode support a substantial potential difference (e.g. greater than about 0.1V) after charging and from which electrical charge can be extracted during discharge at a positive cell voltage.

As used herein, and as a person skilled in the art would know, the expression 'positive electrode' refers to the electrode at which electrons enter the cell during discharge. By reference to its functionality during discharge, the positive electrode is also commonly referred to in the art as a 'cathode'.

A positive electrode may comprise (or be made of) material that can reversibly intercalate sodium ions within their lattice structure, absorb/desorb sodium ions by reversible oxidation/reduction reactions, or promote alloying/dealloying reactions with sodium as described herein. The expression 'positive electrode may comprise' is intended to be a reference the composition of the positive electrode per se, absent the electrolyte composition.

A positive electrode of the cell according to the invention is not limited to any particular electrode material, provided that when in electrical contact with the sodium-ion electrolyte composition of the invention it allows for the specific interaction between sodium ions and the positive electrode as described herein.

Examples of material which the positive electrode may comprise (or be made of) include layered sodium transition metal oxides ($AMO_2$ type including solid solutions of $NaCoO_2$, $NaFeO_2$, $NaMnO_2$, $NaNiO_2$). These are typically designated as O3 (ABCABC stacking), P2 ABBA stacking) and P3 (ABBCCA stacking) where $Na^+$ adopts either prismatic (i.e., =P) or octahedral (i.e., =O) coordination environments. These include $P2-Na_{0.66}Co_{0.66}Mn_{0.33}O_2$, $P2-Na_{0.66}Mn_{0.5}Fe_{0.5}O_2$, $P2-Na_{5/6}[Li_{1/4}Mn_{3/4}]O_2$, $Na_{0.45}Ni_{0.22}Co_{0.11}Mn_{0.66}O_2$. Sodium 'polyanion' materials also can be used as positive electrode materials, these include olivine-type $NaFePO_4$, fluorophosphates and pyrophosphates, Nasicon type phases of general formula $Na_2M_2(XO_4)_3$ (M=transition metal and X=P, S e.g., $Na_3V_2(PO_4)_3$, $Na_3V_2(PO_4)_2F_3$), Fluorosulfates and Sulfates (e.g., $NaFSO_4F$, and $Na_2M(SO_4)_2 \cdot 4H_2O$ (M=Mg, Fe, Co, Ni)), ferrophosphates (e.g. $Na_2FeP_2O_7$) and silicates. Prussian-blue analogues have also been used as positive electrodes (i.e., $Na_{2-x}M_A[M_B(CN)_6]_y \cdot zH_2O$—$M_A$ and $M_B$ are transition metals and hexacyano-metallate vacancies exist.)

In some embodiments, the positive electrode is a capacitor, for example a carbon capacitor. The carbon electrode used in the electrochemical cell as a positive capacitor electrode is prepared as a composite material by a casting and blading method, of the kind typically used for preparing thin solid film electrodes. The carbon composite positive electrode is subjected to a charging current substantially equal and opposite to the sodium negative electrode charging current to the specified voltage limit.

A sodium electrochemical cell of the invention, when in a full-cell configuration, may also support a current density at the negative electrode having values described herein.

A sodium electrochemical cell of the invention, when in a full-cell configuration and undergoing polarisation or charge/discharge cycles as described herein, may also support a current density at the negative electrode having values described herein.

A full-cell configuration the cell of the invention can advantageously find application as an energy storage device, for example as a sodium rechargeable battery. The specific current density that the cell of the invention supports advantageously provides for a sodium rechargeable battery with high discharge capacity and supporting high current charge-discharge rates.

Accordingly, the present invention also provides a sodium rechargeable battery comprising a negative electrode, a positive electrode and a sodium-ion electrolyte composition as described herein.

As used herein, the term 'alkyl', used either alone or in compound words, describes a group composed of at least one carbon and hydrogen atom, and denotes straight chain, branched or cyclic alkyl, for example $C_{1-20}$ alkyl, e.g. $C_{1-10}$ or $C_{1-6}$. Examples of straight chain and branched alkyl include methyl, ethyl, n-propyl, isopropyl, n-butyl, sec-butyl, t-butyl, n-pentyl, 1,2-dimethylpropyl, 1,1-dimethylpropyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl pentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like. Where an alkyl group is referred to generally as 'propyl', butyl' etc, it will be understood that this can refer to any of straight, branched and cyclic isomers where appropriate. An alkyl group may be optionally substituted by one or more substituents, which include substituents in which a carbon has been substituted with a heteroatom (such as O, N, S), as herein defined.

The term 'aryl' (or 'carboaryl') denotes any of single, polynuclear, conjugated and fused residues of aromatic hydrocarbon ring systems (e.g. $C_{6-24}$ or $C_{6-18}$). Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. Preferred aryl include phenyl and naphthyl. An aryl group may or may not be optionally substituted by one or more optional substituents, which include substituents in which a carbon has been substituted with a heteroatom (such as O, N, S), as herein defined. The term 'arylene' is intended to denote the divalent form of aryl.

In this specification 'optionally substituted' is taken to mean that a group may or may not be substituted or fused (so as to form a condensed polycyclic group) with one, two, three or more of organic and inorganic groups, including those selected from: phosphonium salt (as herein defined), alkyl, alkenyl, alkynyl, carbocyclyl, aryl, heterocyclyl, heteroaryl, acyl, aralkyl, alkaryl, alkheterocyclyl, alkheteroaryl, alkcarbocyclyl, halo, haloalkyl, haloalkenyl, haloalkynyl, haloaryl, halocarbocyclyl, haloheterocyclyl, haloheteroaryl, haloacyl, haloaryalkyl, hydroxy, hydroxyalkyl, hydroxyalkenyl, hydroxyalkynyl, hydroxycarbocyclyl, hydroxyaryl, hydroxyheterocyclyl, hydroxyheteroaryl, hydroxyacyl, hydroxyaralkyl, alkoxyalkyl, alkoxyalkenyl, alkoxyalkynyl, alkoxycarbocyclyl, alkoxyaryl, alkoxyheterocyclyl, alkoxyheteroaryl, alkoxyacyl, alkoxyaralkyl, alkoxy, alkenyloxy, alkynyloxy, aryloxy, carbocyclyloxy, aralkyloxy, heteroaryloxy, heterocyclyloxy, acyloxy, haloalkoxy, haloalkenyloxy, haloalkynyloxy, haloaryloxy, halocarbocyclyloxy, haloaralkyloxy, haloheteroaryloxy, haloheterocyclyloxy, haloacyloxy, nitro, nitroalkyl, nitroalkenyl, nitroalkynyl, nitroaryl, nitroheterocyclyl, nitroheteroayl, nitrocarbocyclyl, nitroacyl, nitroaralkyl, amino ($NH_2$), alkylamino, dialkylamino, alkenylamino, alkynylamino, arylamino, diarylamino, aralkylamino, diaralkylamino, acylamino, diacylamino, heterocyclamino, heteroarylamino, carboxy, carboxyester, amido, alkylsulphonyloxy, arylsulphenyloxy, alkylsulphenyl, arylsulphenyl, thio, alkylthio, alkenylthio, alkynylthio, arylthio, aralkylthio, carbocylylthio, heterocyclylthio, heteroarylthio, acylthio, sulfoxide, sulfonyl, sulfonamide, aminoalkyl, aminoalkenyl, aminoalkynyl, aminocarbocyclyl, aminoaryl, aminoheterocyclyl, aminoheteroaryl, aminoacyl, aminoaralkyl, thioalkyl, thioalkenyl, thioalkynyl, thiocarbocyclyl, thioaryl, thioheterocyclyl, thioheteroaryl, thioacyl, thioaralkyl, carboxyalkyl, carboxyalkenyl, carboxyalkynyl, carboxycarbocyclyl, carboxyaryl, carboxyheterocyclyl, carboxyheteroaryl, carboxyacyl, carboxyaralkyl, carboxyesteralkyl, carboxyesteralkenyl, carboxyesteralkynyl, carboxyestercarbocyclyl, carboxyesteraryl, carboxyesterheterocyclyl, carboxyesterheteroaryl, carboxyesteracyl, carboxyesteraralkyl, amidoalkyl, amidoalkenyl, amidoalkynyl, amidocarbocyclyl, amidoaryl, amidoheterocyclyl, amidoheteroaryl, amidoacyl, amidoaralkyl, formylalkyl, formylalkenyl, formylalkynyl, formylcarbocyclyl, formylaryl, formylheterocyclyl, formylheteroaryl, formylacyl, formylaralkyl, acylalkyl, acylalkenyl, acylalkynyl, acylcarbocyclyl, acylaryl, acylheterocyclyl, acylheteroaryl, acylacyl, acylaralkyl, sulfoxidealkyl, sulfoxidealkenyl, sulfoxidealkynyl, sulfoxidecarbocyclyl, sulfoxidearyl, sulfoxideheterocyclyl, sulfoxideheteroaryl, sulfoxideacyl, sulfoxidearalkyl, sulfonylalkyl, sulfonylalkenyl, sulfonylalkynyl, sulfonylcarbocyclyl, sulfonylaryl, sulfonylheterocyclyl, sulfonylheteroaryl, sulfonylacyl, sulfonylaralkyl, sulfonamidoalkyl, sulfonamidoalkenyl, sulfonamidoalkynyl, sulfonamidocarbocyclyl, sulfonamidoaryl, sulfonamidoheterocyclyl, sulfonamidoheteroaryl, sulfonamidoacyl, sulfonamidoaralkyl, nitroalkyl, nitroalkenyl, nitroalkynyl, nitrocarbocyclyl, nitroaryl, nitroheterocyclyl, nitroheteroaryl, nitroacyl, nitroaralkyl, cyano, sulfate and phosphate groups. Optional substitution may also be taken to refer to where a —$CH_2$— group in a chain or ring is replaced by a group selected from —O—, —S—, —$NR^a$—, —C(O)— (i.e. carbonyl), —C(O)O— (i.e. ester), and —C(O)$NR^a$— (i.e. amide), where $R^a$ is as herein defined, such as alkyl or aryl.

Examples of optional substituents include alkyl, (e.g. $C_{1-6}$ alkyl such as methyl, ethyl, propyl, butyl, cyclopropyl, cyclobutyl, cyclopentyl or cyclohexyl), hydroxyalkyl (e.g. hydroxymethyl, hydroxyethyl, hydroxypropyl), alkoxyalkyl (e.g. methoxymethyl, methoxyethyl, methoxypropyl, ethoxymethyl, ethoxyethyl, ethoxypropyl etc) alkoxy (e.g. $C_{1-6}$ alkoxy such as methoxy, ethoxy, propoxy, butoxy, cyclopropoxy, cyclobutoxy), halo, trifluoromethyl, trichloromethyl, tribromomethyl, hydroxy, phenyl (which itself may be further substituted e.g., by $C_{1-6}$ alkyl, halo, hydroxy, hydroxy$C_{1-6}$ alkyl, $C_{1-6}$ alkoxy, halo$C_{1-6}$alkyl, cyano, nitro OC(O)$C_{1-6}$ alkyl, and amino), benzyl (wherein benzyl itself may be further substituted e.g., by $C_{1-6}$ alkyl, halo, hydroxy, hydroxy$C_{1-6}$alkyl, $C_{1-6}$ alkoxy, halo$C_{1-6}$ alkyl, cyano, nitro OC(O)$C_{1-6}$ alkyl, and amino), phenoxy (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), benzyloxy (wherein benzyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), amino, alkylamino (e.g. $C_{1-6}$ alkyl, such as methylamino, ethylamino, propylamino etc), dialkylamino (e.g. $C_{1-6}$ alkyl, such as dimethylamino, diethylamino, dipropylamino), acylamino (e.g. NHC(O)$CH_3$), phenylamino (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), nitro, formyl, —C(O)-alkyl (e.g. $C_{1-6}$ alkyl, such as acetyl), O—C(O)-alkyl (e.g. $C_{1-6}$alkyl, such as acetyloxy), benzoyl (wherein the phenyl group itself may be further substituted e.g., by $C_{1-6}$ alkyl, halo, hydroxy hydroxy$C_{1-6}$ alkyl, $C_{1-6}$ alkoxy, halo$C_{1-6}$ alkyl, cyano, nitro OC(O)$C_{1-6}$alkyl, and amino), replacement of $CH_2$ with C=O, $CO_2H$, $CO_2$alkyl (e.g. $C_{1-6}$ alkyl such as methyl ester, ethyl ester, propyl ester, butyl ester), $CO_2$phenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), $CONH_2$, CONHphenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), CONHbenzyl (wherein benzyl itself may be further substituted e.g., by $C_{1-6}$ alkyl, halo, hydroxy hydroxyl $C_{1-6}$ alkyl, $C_{1-6}$ alkoxy, halo $C_{1-6}$ alkyl, cyano, nitro OC(O)$C_{1-6}$ alkyl, and amino), CONHalkyl (e.g. $C_{1-6}$ alkyl such as methyl ester, ethyl ester, propyl ester, butyl amide) CONHdialkyl (e.g. $C_{1-6}$ alkyl) aminoalkyl (e.g., HN $C_{1-6}$ alkyl-, $C_{1-6}$alkylHN—$C_{1-6}$ alkyl- and ($C_{1-6}$ alkyl)$_2$N—$C_{1-6}$ alkyl-), thioalkyl (e.g., HS $C_{1-6}$ alkyl-), carboxyalkyl (e.g., $HO_2CC_{1-6}$ alkyl-), carboxyesteralkyl (e.g., $C_{1-6}$ alkyl$O_2CC_{1-6}$ alkyl-), amidoalkyl (e.g., $H_2N$(O)$CC_{1-6}$ alkyl-, H($C_{1-6}$ alkyl)N(O)$CC_{1-6}$ alkyl-), formylalkyl (e.g., OHC$C_{1-6}$alkyl-), acylalkyl (e.g., $C_{1-6}$ alkyl(O)$CC_{1-6}$ alkyl-), nitroalkyl (e.g., $O_2NC_{1-6}$ alkyl-), sulfoxidealkyl (e.g., $R^f$(O)S$C_{1-6}$ alkyl where $R^f$ is as herein as defined for example alkyl, such as $C_{1-6}$ alkyl(O)S$C_{1-6}$ alkyl-), sulfonylalkyl (e.g., $R^f(O)_2SC_{1-6}$ alkyl where $R^f$ is as herein defined for example alkyl, such as $C_{1-6}$ alkyl$(O)_2$S$C_{1-6}$ alkyl-), sulfonamidoalkyl (e.g., $_2HR^fN(O)SC_{1-6}$ alkyl where Rf is as herein defined, for example alkyl, such as H($C_{1-6}$ alkyl)N(O)S$C_{1-6}$ alkyl-).

The term 'alkenyl' as used herein denotes groups formed from straight chain, branched or cyclic hydrocarbon residues containing at least one carbon to carbon double bond including ethylenically mono-, di- or polyunsaturated alkyl or cycloalkyl groups as previously defined, preferably $C_{2-20}$ alkenyl (e.g. $C_{2-10}$ or $C_{2-6}$). Examples of alkenyl include vinyl, allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl. An alkenyl group may be optionally substituted by one or more optional substituents as herein defined.

As used herein the term 'alkynyl' denotes groups formed from straight chain, branched or cyclic hydrocarbon residues containing at least one carbon-carbon triple bond including ethylenically mono-, di- or polyunsaturated alkyl or cycloalkyl groups as previously defined. Unless the number of carbon atoms is specified the term preferably refers to $C_{2-20}$ alkynyl (e.g. $C_{2-10}$ or $C_{2-6}$). Examples include ethynyl, 1-propynyl, 2-propynyl, and butynyl isomers, and pentynyl isomers. An alkynyl group may be optionally substituted by one or more optional substituents as herein defined.

The term 'halogen' ('halo') denotes fluorine, chlorine, bromine or iodine (fluoro, chloro, bromo or iodo). Preferred halogens are chlorine, bromine or iodine.

The term 'carbocyclyl' includes any of non-aromatic monocyclic, polycyclic, fused or conjugated hydrocarbon residues, preferably $C_{3-20}$ (e.g. $C_{3-10}$ or $C_{3-8}$). The rings may be saturated, e.g. cycloalkyl, or may possess one or more double bonds (cycloalkenyl) and/or one or more triple bonds (cycloalkynyl). Particularly preferred carbocyclyl moieties are 5-6-membered or 9-10 membered ring systems. Suitable examples include cyclopropyl, cyclobutyl, cyclopentyl, cyclohexyl, cycloheptyl, cyclooctyl, cyclononyl, cyclodecyl, cyclopentenyl, cyclohexenyl, cyclooctenyl, cyclopentadienyl, cyclohexadienyl, cyclooctatetraenyl, indanyl, decalinyl and indenyl. A carbocyclyl group may be optionally substituted by one or more optional substituents as herein defined. The term 'carbocyclylene' is intended to denote the divalent form of carbocyclyl.

The term 'heterocyclyl' or 'heterocyclic' when used alone or in compound words includes any of monocyclic, polycyclic, fused or conjugated hydrocarbon residues, preferably $C_{3-20}$ (e.g. $C_{3-10}$ or $C_{3-8}$) wherein one or more carbon atoms are replaced by a heteroatom so as to provide a non-aromatic residue. Suitable heteroatoms include O, N, S, P and Se. Where two or more carbon atoms are replaced, this may be by two or more of the same heteroatom or by different heteroatoms. The heterocyclyl group may be saturated or partially unsaturated, i.e. possess one or more double bonds. Particularly preferred heterocyclyl are 5-6 and 9-10 membered heterocyclyl. Suitable examples of heterocyclyl groups may include azridinyl, oxiranyl, thiiranyl, azetidinyl, oxetanyl, thietanyl, 2H-pyrrolyl, pyrrolidinyl, pyrrolinyl, piperidyl, piperazinyl, morpholinyl, indolinyl, imidazolidinyl, imidazolinyl, pyrazolidinyl, thiomorpholinyl, dioxanyl, tetrahydrofuranyl, tetrahydropyranyl, tetrahydropyrrolyl, tetrahydrothiophenyl, pyrazolinyl, dioxalanyl, thiazolidinyl, isoxazolidinyl, dihydropyranyl, oxazinyl, thiazinyl, thiomorpholinyl, oxathianyl, dithianyl, trioxanyl, thiadiazinyl, dithiazinyl, trithianyl, azepinyl, oxepinyl, thiepinyl, indenyl, indanyl, 3H-indolyl, isoindolinyl, 4H-quinolazinyl, chromenyl, chromanyl, isochromanyl, pyranyl and dihydropyranyl. A heterocyclyl group may be optionally substituted by one or more optional substituents as herein defined. The term 'heterocyclylene' is intended to denote the divalent form of heterocyclyl.

The term 'heteroaryl' includes any of monocyclic, polycyclic, fused or conjugated hydrocarbon residues, wherein one or more carbon atoms are replaced by a heteroatom so as to provide an aromatic residue. Preferred heteroaryl have 3-20 ring atoms, e.g. 3-10. Particularly preferred heteroaryl are 5-6 and 9-10 membered bicyclic ring systems. Suitable heteroatoms include, O, N, S, P and Se, particularly O, N and S. Where two or more carbon atoms are replaced, this may be by two or more of the same heteroatom or by different heteroatoms. Suitable examples of heteroaryl groups may include pyridyl, pyrrolyl, thienyl, imidazolyl, furanyl, benzothienyl, isobenzothienyl, benzofuranyl, isobenzofuranyl, indolyl, isoindolyl, pyrazolyl, pyrazinyl, pyrimidinyl, pyridazinyl, indolizinyl, quinolyl, isoquinolyl, phthalazinyl, 1,5-naphthyridinyl, quinozalinyl, quinazolinyl, quinolinyl, oxazolyl, thiazolyl, isothiazolyl, isoxazolyl, triazolyl, oxadialzolyl, oxatriazolyl, triazinyl, and furazanyl. A heteroaryl group may be optionally substituted by one or more optional substituents as herein defined. The term 'heteroarylene' is intended to denote the divalent form of heteroaryl.

The term 'acyl' either alone or in compound words denotes a group containing the moiety C=O (and not being a carboxylic acid, ester or amide) Preferred acyl includes $C(O)$—$R^e$, wherein $R^e$ is hydrogen or an alkyl, alkenyl, alkynyl, aryl, heteroaryl, carbocyclyl, or heterocyclyl residue. Examples of acyl include formyl, straight chain or branched alkanoyl (e.g. $C_{1-20}$) such as acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; cycloalkylcarbonyl such as cyclopropylcarbonyl cyclobutylcarbonyl, cyclopentylcarbonyl and cyclohexylcarbonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl]; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aryloxyalkanoyl such as phenoxyacetyl and phenoxypropionyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolyglyoxyloyl and thienylglyoxyloyl. The R' residue may be optionally substituted as described herein.

The term 'sulfoxide', either alone or in a compound word, refers to a group $—S(O)R^f$ wherein $R^f$ is selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl.

The term 'sulfonyl', either alone or in a compound word, refers to a group $S(O)_2$—$R^f$, wherein $R^f$ is selected from hydrogen, alkyl, alkenyl, alkynyl, aryl, heteroaryl, heterocyclyl, carbocyclyl and aralkyl. Examples of preferred $R^f$ include $C_{1-20}$alkyl, phenyl and benzyl.

The term 'sulfonamide', either alone or in a compound word, refers to a group $S(O)NR^fR^f$ wherein each $R^f$ is independently selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl. In a preferred embodiment at least one $R^f$ is hydrogen. In another form, both $R^f$ are hydrogen.

The term, 'amino' is used here in its broadest sense as understood in the art and includes groups of the formula $NR^aR^b$ wherein $R^a$ and $R^b$ may be independently selected from hydrogen, alkyl, alkenyl, alkynyl, aryl, carbocyclyl, heteroaryl, heterocyclyl, arylalkyl, and acyl. $R^a$ and $R^b$, together with the nitrogen to which they are attached, may also form a monocyclic, or polycyclic ring system e.g. a 3-10 membered ring, particularly, 5-6 and 9-10 membered systems. Examples of 'amino' include $NH_2$, NHalkyl (e.g. $C_{1-20}$alkyl), NHaryl (e.g. NHphenyl), NHaralkyl (e.g. NHbenzyl), NHacyl (e.g. $NHC(O)C_{1-20}$alkyl, NHC(O)phenyl), Nalkylalkyl (wherein each alkyl, for example $C_{1-20}$, may be the same or different) and 5 or 6 membered rings, optionally containing one or more same or different heteroatoms (e.g. O, N and S).

The term 'amido' is used here in its broadest sense as understood in the art and includes groups having the formula $C(O)NR^aR^b$, wherein $R^a$ and $R^b$ are as defined as above. Examples of amido include $C(O)NH_2$, C(O)NHalkyl (e.g. $C_{1-20}$alkyl), C(O)NHaryl (e.g. C(O)NHphenyl), C(O)

NHaralkyl (e.g. C(O)NHbenzyl), C(O)NHacyl (e.g. C(O)NHC(O)$C_{1-20}$alkyl, C(O)NHC(O)phenyl), C(O)Nalkylalkyl (wherein each alkyl, for example $C_{1-20}$, may be the same or different) and 5 or 6 membered rings, optionally containing one or more same or different heteroatoms (e.g. O, N and S).

The term 'carboxy ester' is used here in its broadest sense as understood in the art and includes groups having the formula $CO_2R^g$, wherein $R^g$ may be selected from groups including alkyl, alkenyl, alkynyl, aryl, carbocyclyl, heteroaryl, heterocyclyl, aralkyl, and acyl. Examples of carboxy ester include $CO_2C_{1-20}$alkyl, $CO_2$aryl (e.g. $CO_2$phenyl), $CO_2$aralkyl (e.g. $CO_2$ benzyl).

The term 'heteroatom' or 'hetero' as used herein in its broadest sense refers to any atom other than a carbon atom which may be a member of a cyclic organic group. Particular examples of heteroatoms include nitrogen, oxygen, sulfur, phosphorous, boron, silicon, selenium and tellurium, more particularly nitrogen, oxygen and sulfur.

For monovalent substituents, terms written as '[groupA][group B]' refer to group A when linked by a divalent form of group B. For example, '[group A][alkyl]' refers to a particular group A (such as hydroxy, amino, etc.) when linked by divalent alkyl, i.e. alkylene (e.g. hydroxyethyl is intended to denote HO—$CH_2$—CH—). Thus, terms written as '[group]oxy' refer to a particular group when linked by oxygen, for example, the terms 'alkoxy' or 'alkyloxy', 'alkenoxy' or 'alkenyloxy', 'alkynoxy' or alkynyloxy', 'aryloxy' and 'acyloxy', respectively, denote alkyl, alkenyl, alkynyl, aryl and acyl groups as hereinbefore defined when linked by oxygen. Similarly, terms written as '[group]thio' refer to a particular group when linked by sulfur, for example, the terms 'alkylthio', 'alkenylthio', alkynylthio' and 'arylthio', respectively, denote alkyl, alkenyl, alkynyl and aryl groups as hereinbefore defined when linked by sulfur.

In some instances the substituent may be a charged chain (e.g. in sulfonic acid polymers, i.e. PAMPS). For example, the substituent may possess a positively charged group (e.g. phoshononium, ammonium), thus making for a double charged cation.

The invention is herein after described with reference to the following non-limiting examples.

EXAMPLES

Trimethyl-Isobutyl-Phosphonium[TFSI]/Na[TFSI] Electrolyte Composition

Trimethyl-isobutyl-phosphonium bis(trifluoromethylsulfonyl)amide (or $P_{111i4}$[TFSI]) synthesized by Cytec Canada Inc was used as the phosphonium-based OIPC. The OIPC was dried under vacuum at 80° C. for three days, using sodium hydride (NaH) to remove moisture. Water content was checked by Karl Fischer titration not to exceed 50 ppm. Sodium bis(trifluoromethylsulfonyl)amide (Na[TFSI], 99.998% purity) was purchased from Solvionic and used as received. A number of $P_{111i4}$[TFSI]/Na[TFSI] electrolyte compositions containing increasing sodium concentration were made by combining the appropriate amount of sodium salt and OIPC. After obtaining the homogeneous mixtures they were held in the vacuum oven for 5 hours and then samples were stored in hermetically sealed vials under an argon atmosphere inside a glove box.

Example 1

Differential Scanning Calorimetry (DSC)

A Mettler Toledo DSC1 instrument was utilized. The DSC uses STAReV6.10 software to analyse the (transition) enthalpy and (transition) onset (temperature) as well as peak temperature of any phase transitions (solid-solid, solid-liquid and liquid-solid transitions). The instrument has two aluminium pans one of which is sample pan containing 3-5 mg of sample and another is empty pan as a reference. Both pans are inside a holder to which is attached a heater and cooler. All samples were prepared inside the glove box due to moisture sensitivity of samples.

The instrument was calibrated using a cyclohexane standard and an indium standard. A scan rate of 2° C./min was applied to change temperature from −60° C. to 70° C. for some compositions and up to 250° C. for other sample compositions. Three temperature scans were applied; for one composition (20 mol % of Na[TFSI]) the first scan was different to subsequent scans due to thermal history and thus the second and third scans (show reproducible data) are reported. For consistency, the second scan of all samples are reported.

DSC Data for $P_{111i4}$[TFSI]/Na[TFSI] Electrolyte Composition

Adding Na[TFSI] to the pure OIPC lowers the melting point of the mixed system compared to the pure materials. The corresponding phase diagram for the $P_{111i4}$[TFSI]/Na[TFSI] binary system, extracted from careful analyses of DSC data as well as monitoring the visual melting point of some compositions, is presented in FIG. 2.

The phase diagram has three main features: (1) the presence of a mixed salt crystalline phase at 20 mol % of Na[TFSI] with a stoichiometry of 4/1 ($P_{111i4}$[TFSI]/Na[TFSI]), C in the phase diagram, (2) the presence of an eutectic transition at 35° C. with eutectic composition of 5 mol % at which the electrolyte composition undergoes a L→(A+C) transition (a being OIPC-rich phase and C being the intermediate compound) and (3) the presence of an incongruous melting of this new crystalline phase at 45° C. which is a result of a peritectic reaction ((L+B')→C where B' is the sodium salt rich phase). Below the eutectic transition two distinct solid phases form, one of which belongs to the OIPC rich phase and the other one is the intermediate compound C.

Table 1 lists the transition temperatures (±1° C.) and the enthalpy changes (error margin±10%) of the pure phosphonium-based OIPC and electrolyte compositions containing up to 50 mol % sodium.

TABLE 1

Phase transition temperature and corresponding enthalpy change of $P_{111i4}$[TFSI]/Na[TFSI] electrolyte composition

| Sodium (mol %) | $T_e$ (° C.) | ΔH (J/g) | $T_m$ (° C.) | ΔH (J/g) |
|---|---|---|---|---|
| 0 | — | — | 40 | 41.31 |
| 5 | 37 | 37 | — | — |
| 10 | 37 | 27 | 40 | 3 |
| 15 | 37 | 18.45 | 43 | 22 |
| 18 | 36 | 5 | 45 | 35 |
| 20 | 36 | 10 | 46 | 27 |
| 25 | 37 | 15 | 45 | 52 |
| 30 | 36 | 7 | 45 | 38 |
| 35 | 36 | 5 | 45 | 21 |
| 40 | 37 | 8 | 45 | 18 |
| 50 | 32 | 4 | 41 | 16 |

Figure 1:
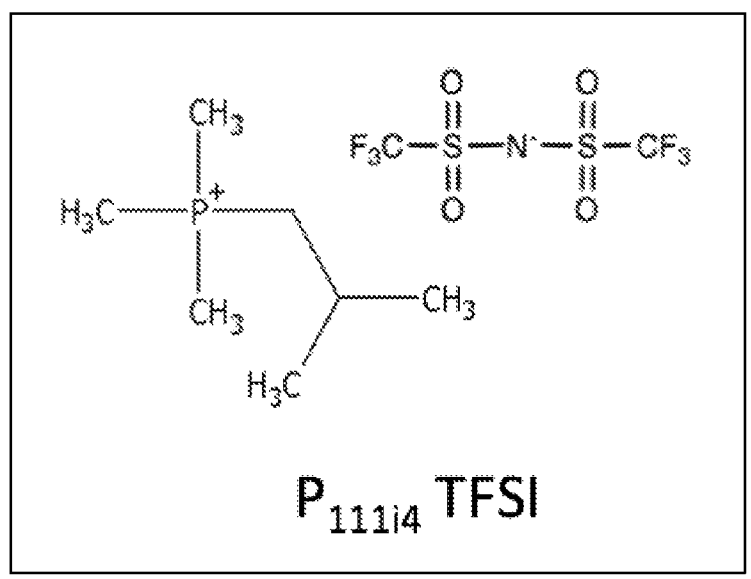
FIG. 1 shows the chemical structure of pure trimethyl-isobutyl-phosphonium bis(trifluoromethylsulfonyl)amide (or $P_{111i4}$[TFSI])
Figure 2:
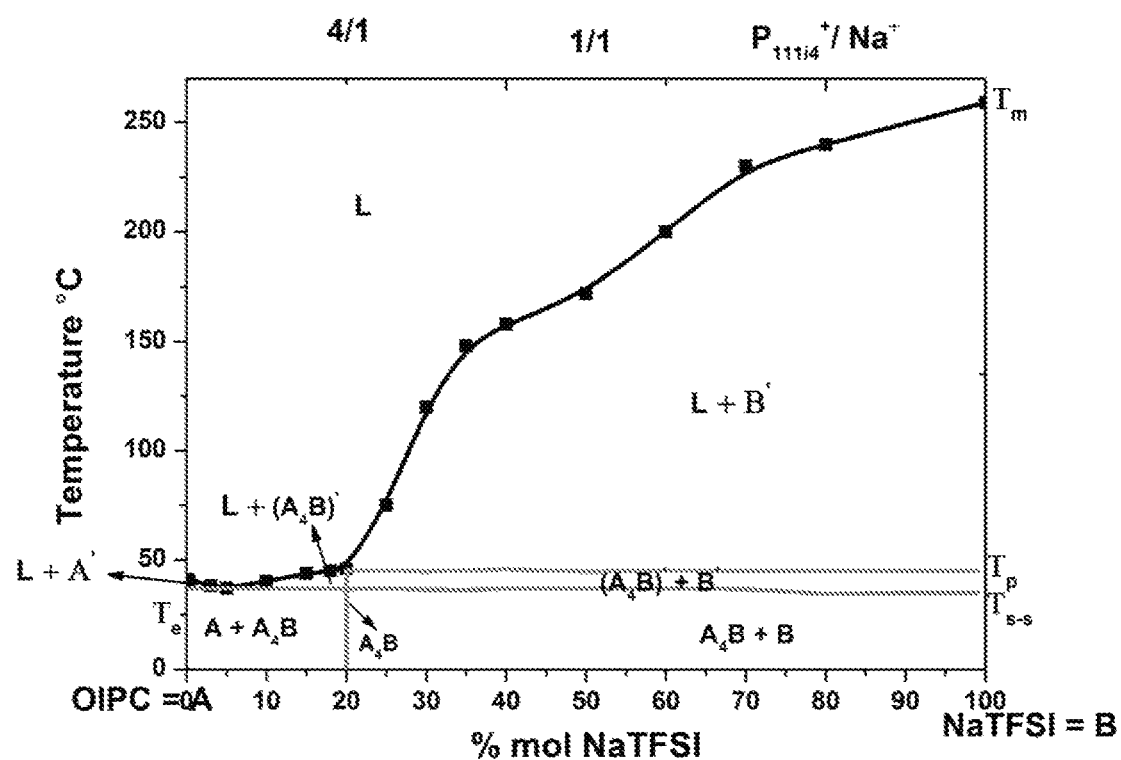
FIG. 2 shows the phase diagram for the $P_{111i4}$[TFSI]/Na[TFSI] electrolyte composition.

The phase diagram of FIG. 2 and the data on Table 1 allows appreciating that for all sodium concentrations the melting temperature of the electrolyte composition is at least 40° C. Thus, for all sodium concentrations the $P_{111i4}$[TFSI]/Na [TFSI] electrolyte composition presents as a solid up to at least 25° C.

Example 2

Scanning Electron Microscopy (SEM)

SEM was performed using a JCM-5000 Neoscope (Jeol Ltd.) desktop SEM. Powder samples were put on the carbon tape inside the glove box and transferred inside the canister. To reduce the exposure of the samples to air, they were flushed with $N_2$ gas whilst transferring to the vacuum chamber. An accelerating voltage of 5 keV was used when acquiring the images.

SEM imaging was performed on various compositions of (1−x) $P_{111i4}$[TFSI]−(x) Na[TFSI]. The SEM image of pure OIPC (FIG. 3(a)) distinctly shows the plastic properties of this material with slip planes observed as seen in previous OIPC examples. At the eutectic composition (5 mol % sodium concentration, FIG. 3(b)) two different phases are observed, one of which belongs to the pure OIPC (or OIPC-rich solid solution) and a second phase which is likely the intermediate compound phase. At 20 mol % sodium concentration (FIG. 3(c)) a compound-enriched phase was obtained which is consistent with the DSC traces. At 25 mol % sodium concentration (FIG. 3(d)), two distinct phases can be seen that are attributed to the sodium-enriched phase and compound phase.

Figure 3:
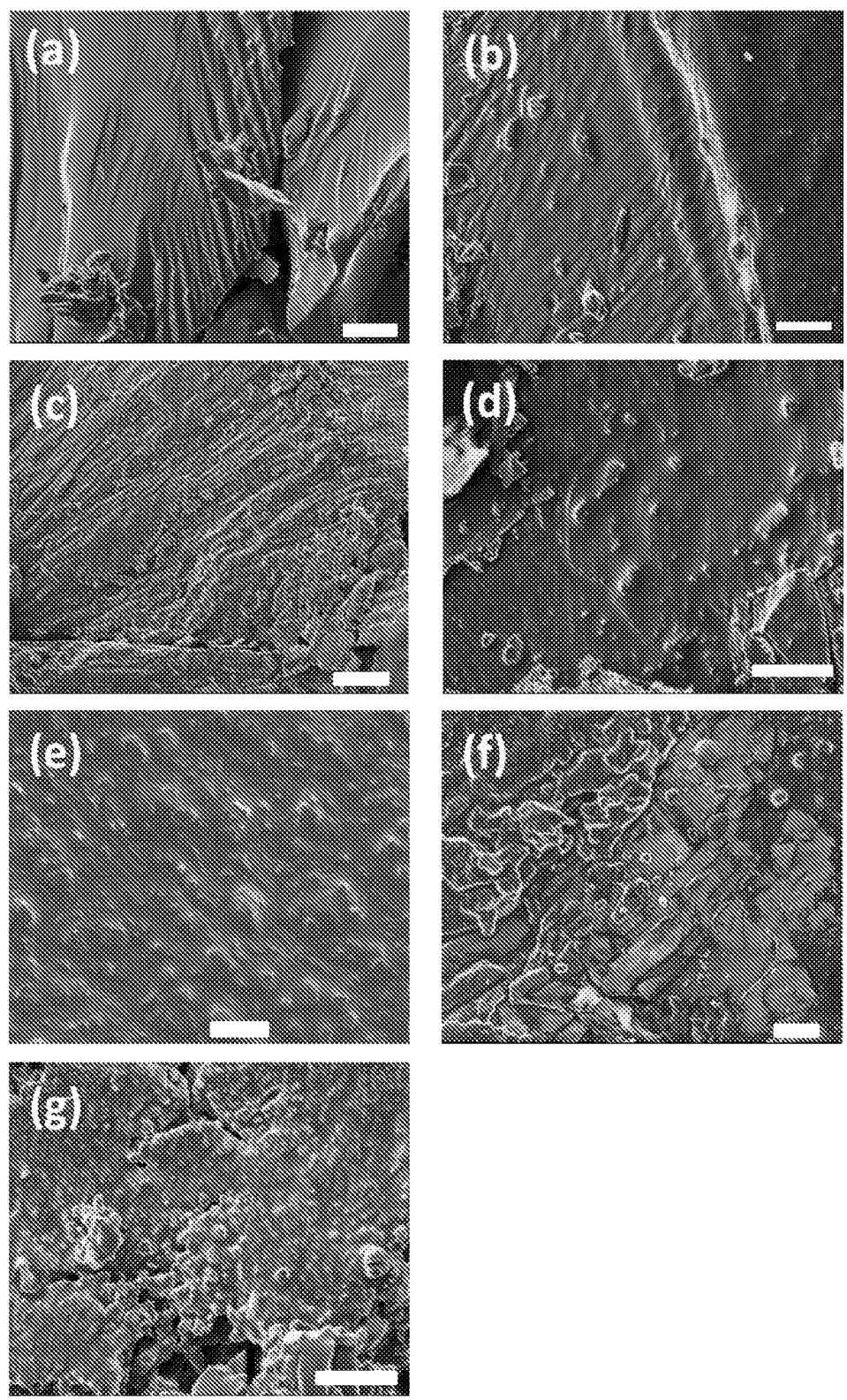
FIG. 3 shows Scanning Electron Microscopy (SEM) images of (a) pure $P_{111i4}$[TFSI], and $P_{111i4}$[TFSI]/Na[TFSI] electrolyte compositions with sodium concentration of (b) 5 mol %, (c) 20 mol %, (d) 25 mol %, (e) 30 mol %, (f) 40 mol %, and (g) 50 mol %.

From the SEM images the volume fraction of the B phase increases at concentrations beyond 25 mol % sodium content (FIGS. 3(e)-(g)). This is confirmation of the formation of a second sodium rich phase with increasing sodium salt.

Example 3

X-Ray Diffraction (XRD)

Synchrotron X-ray powder diffraction (SXRD) was used for identifying the crystallographic structure of pure $P_{111i4}$ [TFSI] and a number of $P_{111i4}$[TFSI]/Na[TFSI] electrolyte compositions. The powder samples were loaded into 300 mm glass capillaries under an argon atmosphere inside the glove box and the open end capillaries were flame sealed. Measurements were carried out at three temperatures for each sample. The temperature variations were performed at a scan rate of 2° C./min and samples were held for an isothermal time of 5 minutes at the target temperature prior to acquisition.

XRD Data of $P_{111i4}$[TFSI]/Na[TFSI] Electrolyte Compositions

X-ray diffraction patterns were obtained for pure $P_{111i4}$ [TFSI] plastic crystal at temperatures of 293, 298 and 100 K and electrolyte compositions containing 20, 25 and 50 mol % Na[TFSI] at temperatures corresponding to before solid-solid phase transition and before and after the peritectic transition identified in the phase diagram above. The diffraction patterns of pure OIPC change before and after the solid-solid phase transition at −60° C. (not shown). Specifically, peak shifts towards lower angles were observed for increased test temperatures. This is indicative of crystal structure changes for the pure material upon transformation from phase II to phase I, observed from the DSC traces. SXRD confirms that the peak shifts are related to the creation of orientational and/or rotational disorder in the OIPC. The diffraction patterns for the binary systems are more complex than for the pure OIPC (FIG. 4).

SXRD of the electrolyte compositions are characterized by peaks shifting to lower angles and disappearance of certain peaks upon passing through the solid-solid phase transitions observed in the DSC. The decreasing number of the reflections is quite obvious for compositions at 25 and 50 mol % sodium above the peritectic transition. This is indicative that, at the peritactic transition a fraction of the composition liquefies to form a liquid phase inhabiting the electrolyte composition, as expected from the phase diagram.

Figure 4:
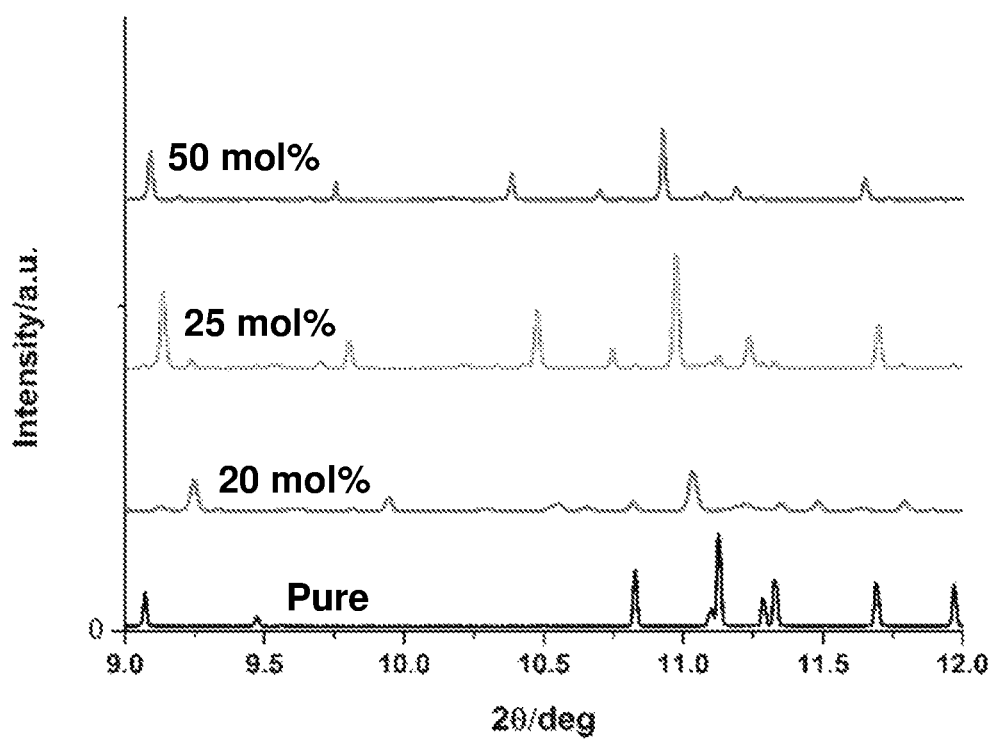
FIG. 4 shows X-ray Diffraction (XRD) patterns measured on pure $P_{111i4}$[TFSI] and $P_{111i4}$[TFSI]/Na[TFSI] electrolyte compositions with sodium concentration of 20 mol %, 25 mol %, and 50 mol %.

The diffraction patterns shown on FIG. 4 compare the diffraction peaks of the pure OIPC with those of electrolyte compositions containing 20 and 50 mol % sodium (at 293 K) and 25 mol % (at 298 K). The XRD trace of the composition at 20 mol % sodium differs from that of the pure OIPC. Specifically, numerous additional reflections are observed in the diffractogram measured for the composition at 20 mol % sodium. These extra peaks are not completely coincident with the pure Na[TFSI] either (not shown). These findings confirm the presence of a new phase in the composition at 20 mol % sodium, which is again consistent with the binary phase diagram of FIG. 2. In the case of the compositions at 25 and 50 mol % sodium, the diffraction plots show a similar distribution of peaks having the same relative intensity, albeit slightly shifted in angle. Furthermore, only the major peaks appearing in the plots of the 25 and 50 mol % sodium compositions appear to present themselves in the plot of the 20 mol % sodium composition, albeit at shifted angles. This is indicative that the compositions at 25 and 50 mol % sodium contain both the 20 mol % (y) and the sodium salt enriched phases.

Example 4

Electrochemical Impedance Spectroscopy (EIS)

The ionic conductivity of pure OIPC and OIPC/Na electrolyte compositions have been measured by Electrochemical Impedance Spectroscopy (EIS).

EIS is the response of an electrochemical cell, measured as an AC current, to a sinusoidal AC applied potential. EIS measures the impedance of the cell over a range of frequencies. Data acquired by this technique is expressed graphically in a Bode or a Nyquist plot. A Nyquist plot presents the imaginary part of impedance versus real part and allows us to see if there are multiple processes in the sample. The resistance of the sample was determined from the touch-down point of the impedance onto the x-axis (real part of impedance where imaginary component is zero) of a Nyquist plot (not shown). From this resistance value the conductivity was calculated according to the following equation:

$$R = \frac{1}{\sigma}\frac{l}{A} = G^* \times \frac{1}{\sigma}$$

In which R is the resistance of the electrolyte which is measured from the Nyquist plot in Ω, σ is conductivity in S $cm^{-1}$ and the quantity $$\frac{l}{A}$$

or G* is called cell constant which is shown by the symbol of G* and is determined by measuring the resistance of the cell containing a standard solution whose conductivity is already defined by the equation:

$$G^* = R \times \sigma.$$

After measuring the cell constant and the resistance of the solution the conductivity of the solution is calculated by the equation:

$$\sigma = \frac{G^*}{R}$$

EIS measurements were performed using a dip-cell consisting of two platinum wires covered by glass and dipped into the samples in the liquid state. The entire process of preparation of each sample for dip-cell measurements was performed inside the glove box and conductivity measurement was done after sealing the dip-cell under an argon atmosphere.

Before measuring conductivity, the cell constant (G*) was obtained by calibrating the cell with 0.01 M KCl solution at 25° C. The ionic conductivity was measured using a Biologic MTZ-35 Analyser. Data was collected over a frequency range from 10 MHz to 1 Hz with a voltage amplitude of 0.1 V and over a temperature range of −20 to 70° C. at 10° C. intervals. Before doing the impedance measurements, samples were held at each temperature for 20 minutes to become stable at each target temperature. The dip-cell was put into a heated brass block which was connected to a Eurotherm 2204 temperature controller to control the temperatures. Decreasing the temperature below room temperature was achieved by using liquid $N_2$ or dry ice pellets.

Ionic Conductivity of $P_{111i4}$[TFSI]/Na[TFSI] Electrolyte Composition

Figure 5:
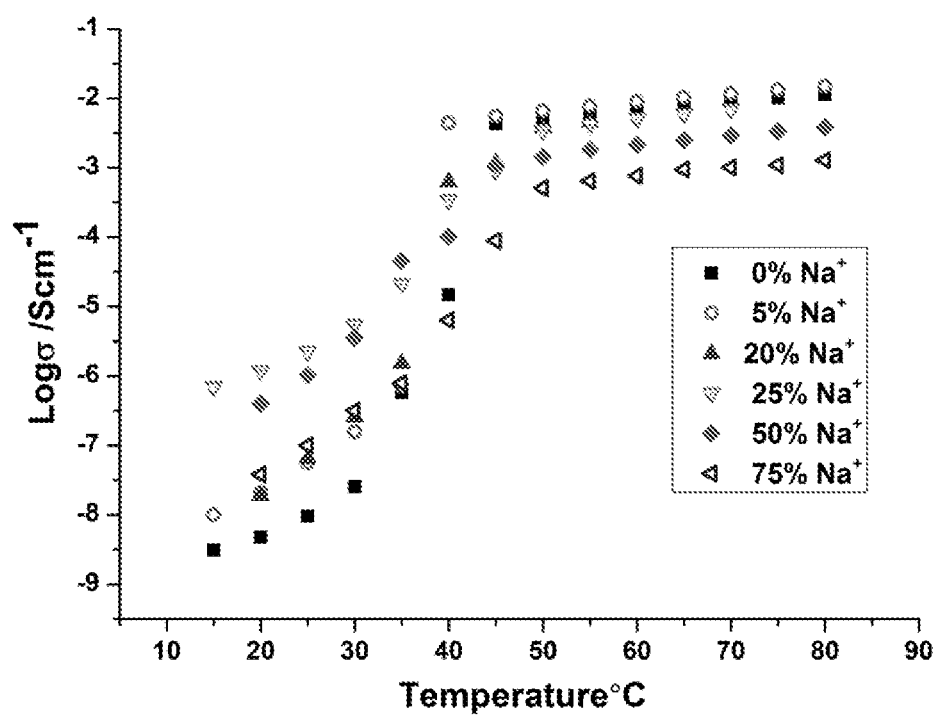
FIG. 5 shows the ionic conductivity of pure $P_{111i4}$[TFSI] and $P_{111i4}$[TFSI]/Na[TFSI] electrolyte compositions with sodium concentration of 0 mol %, 5 mol %, 20 mol %, 25 mol %, 50 mol % and 75 mol %.

The temperature dependent ionic conductivity of the pure $P_{111i4}$[TFSI] and its mixtures with Na[TFSI] are presented in FIG. 5 for electrolyte compositions containing 0, 5, 20, 25, 50 and 75 mol % sodium.

It is observed that the conductivity rises steadily with increasing temperature. In case of the pure OIPC, the conductivity increases gradually from $10^{-8.5}$ S/Cm at 15° C. to $10^{-4.8}$ S/cm at 40° C. After the melting point at 40° C., the conductivity increases sharply, reaching $10^{-2.3}$ S/cm. Upon the addition of 5 mol % Na[TFSI] to the pure $P_{111i4}$[TFSI] OIPC, the conductivity increases over the entire temperature range, with a sharp rise at 36° C. which is most likely due to the eutectic transition, which results in the formation of a fractional liquid phase inhabiting the electrolyte composition.

A similar sharp increase in conductivity at 36° C. is also observed for the other electrolyte compositions (20, 25 and 50 mol % sodium). However, according to the phase diagram these do not undergo a eutectic transition. Instead, this rise in conductivity follows the solid-solid phase transition which was observed in the DSC traces and is indicated on the phase diagram. Moreover, a two-step increase in conductivity is observed in the compositions containing 20, 25 and 50 mol % sodium. The first conductivity step is attributed to the solid-solid phase transition as discussed above, and the second one (45° C.) is related to the peritectic transition. Electrolyte compositions with 25 and 50 mol % sodium exhibit a higher ionic conductivity at temperatures lower than 36° C. (below the eutectic temperature and solid-solid phase transition) compared to the pure OIPC and compositions with 5 and 20 mol % sodium (around 3 orders of magnitude higher ionic conductivity is obtained at 30° C. compared to pure OIPC).

The electrolyte composition with 50 mol % sodium shows lower conductivity at temperatures beyond the peritectic point relative to the composition with 25 mol % sodium. This is because at these temperatures the composition with 50 mol % sodium is mostly solid in comparison to the composition with 25 mol % sodium, which is inhabited by a liquid phase according to the phase diagram. This again supports the view that formation of a fraction of liquid phase inhabiting the electrolyte composition is beneficial to charge transport, resulting in electrolyte compositions with improved ionic conductivity.

Figure 6:
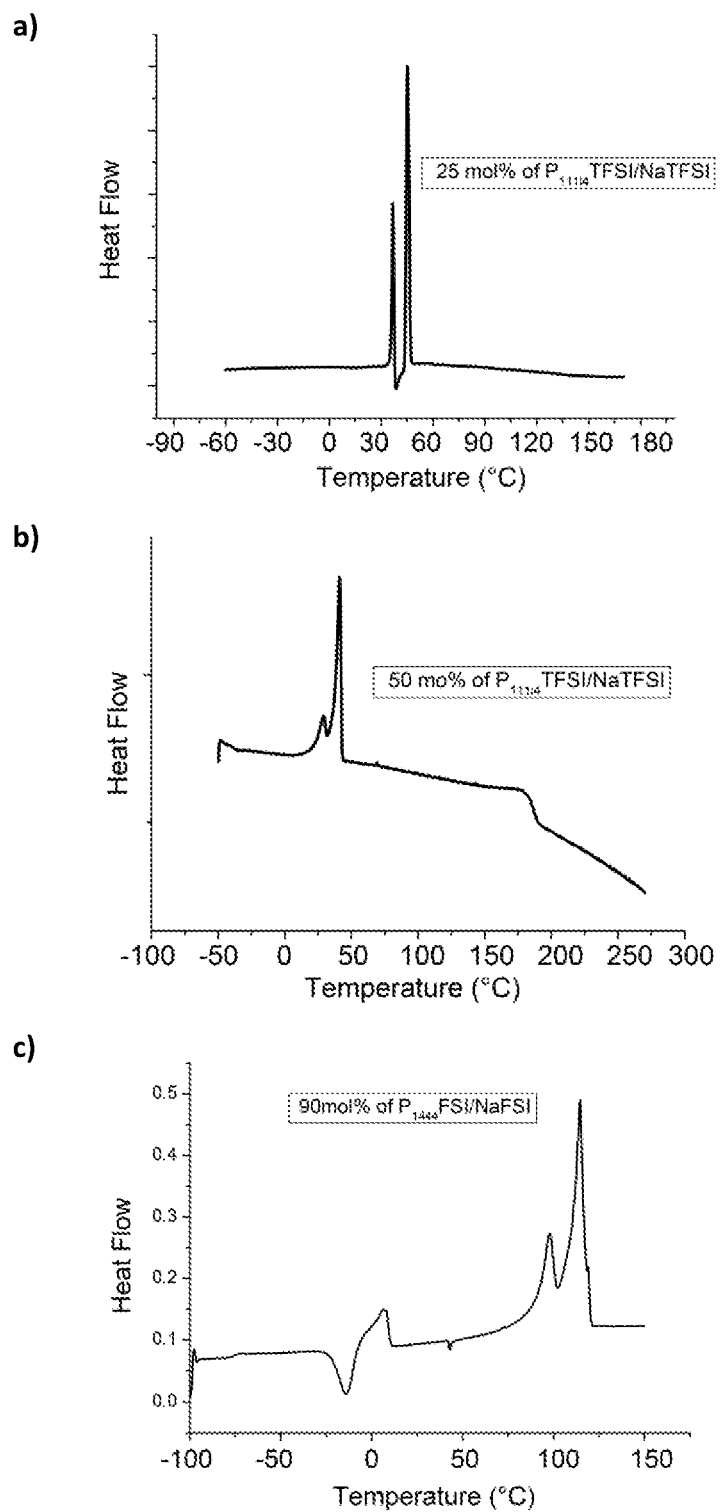
FIG. 6 shows the DSC traces measured for $P_{111i4}$[TFSI]/Na[TFSI] electrolyte compositions with sodium concentration of 25 mol %, 50 mol % and 90 mol %.

Plots a)-c) in FIG. 6 shows the DSC trace of the corresponding compositions, $[P_{111i4}]$[TFSI], 25 mol % (FIG. 6(a)), 50 mol % (FIG. 6(b)) and $[P_{1444}]$[FSI], 90 mol % sodium (FIG. 6(c)). Correlation of the conductivity data (shown in FIG. 5) with the thermal analysis in FIGS. 6(a) and 6(b) highlights the dependence of the conductivity of these mixtures on the thermal phase behaviour.

FIG. 6(c) in particular shows data obtained 2 weeks after the synthesis of the electrolyte, and attests to the stability of electrolyte composition with high sodium concentration at 90 mol %.

Example 5

Cyclic Voltammetry (CV)

Cyclic Voltammetry (CV) was performed to investigate the ability of the $P_{111i4}$[TFSI]/Na[TFSI] electrolyte composition to sustain electrochemical cycling of the target ion (in this case $Na^+ + 1e^- \rightarrow Na$). CV was used to test the redox behaviour of the electrolyte composition with 25 mol % sodium, noting this composition shows the highest conductivity in the solid state.

A BioLogic SP-200 potentiostat was used and the whole process, including preparation of the cell and electrochemical measurements, was performed in an argon-filled glove box. A three electrode cell setup (working electrode, counter electrode and reference electrode) was used for measuring the cyclic voltammograms. A 3 mm diameter Cu electrode as a working electrode and Pt as counter and reference electrodes were used. A scan rate of 10 mV/s was used. Before each experiment the surface of the WE was polished with 0.05 mm alumina powder on a polishing cloth and rinsed in distilled water and ethanol before drying in the oven at 70° C. for one hour. Both RE and CE electrodes, were rinsed with distilled water and ethanol and subsequently dried in an oven at 70° C. for one hour.

CV Data of $P_{111i4}$[TFSI]/Na[TFSI] Electrolyte Composition

Figure 7:
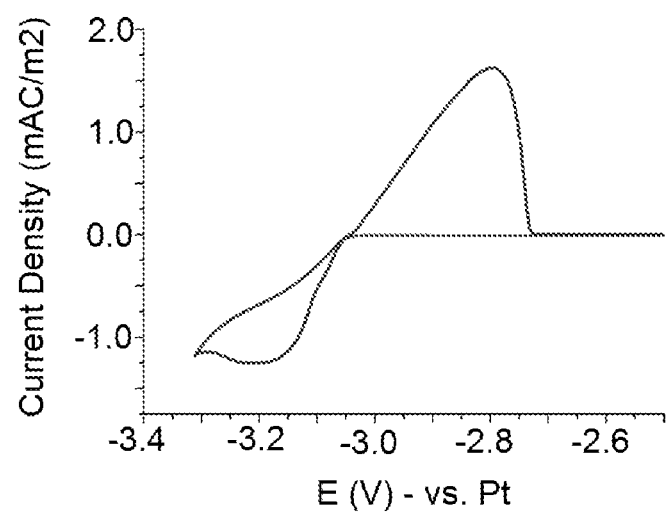
FIG. 7 shows cyclic voltammograms obtained using a $P_{111i4}$[TFSI]/Na[TFSI] electrolyte compositions with sodium concentration of 25 mol % at 50° C. with a scan rate of 10 mV.

The cyclic voltammograms showing sodium deposition and stripping for the electrolyte composition with 25 mol % sodium at 50° C. are shown in FIG. 7. The sharp increase in the cathodic current at −3.2 V vs Pt correspond to the deposition of sodium, while the anodic peaks in the reverse scan are characteristic of the dissolution of the sodium metal.

Table 2 details sodium columbic efficiency calculated for multiple test cycles. The data show that with increasing cycle number the columbic efficiencies increased from 30% to 63% after the first cycle to second cycle. This behavior can be related to the formation of solid electrolyte interface (SEI) film on the electrode that usually is formed during the first cycle (charge).

TABLE 2

The sodium columbic efficiency of some cycles were calculated from integration of reduction ($Q_{red}$) and oxidation ($Q_{ox}$) peaks.

| Number of Cycles | Efficiency (%) ($Q_{ox}/Q_{red}$) × 100 |
|---|---|
| 1$^{st}$ cycle | 30 |
| 2$^{nd}$ cycle | 63 |
| 3$^{rd}$ cycle | 72 |
| 4$^{th}$ cycle | 69 |
| 5$^{th}$ cycle | 65 |

The data show that the reduction and oxidation reactions of the Na is reversible in this electrolytes, which is a very important characteristic if this electrolyte is to be used in a Na device.

Example 6

Figure 8:
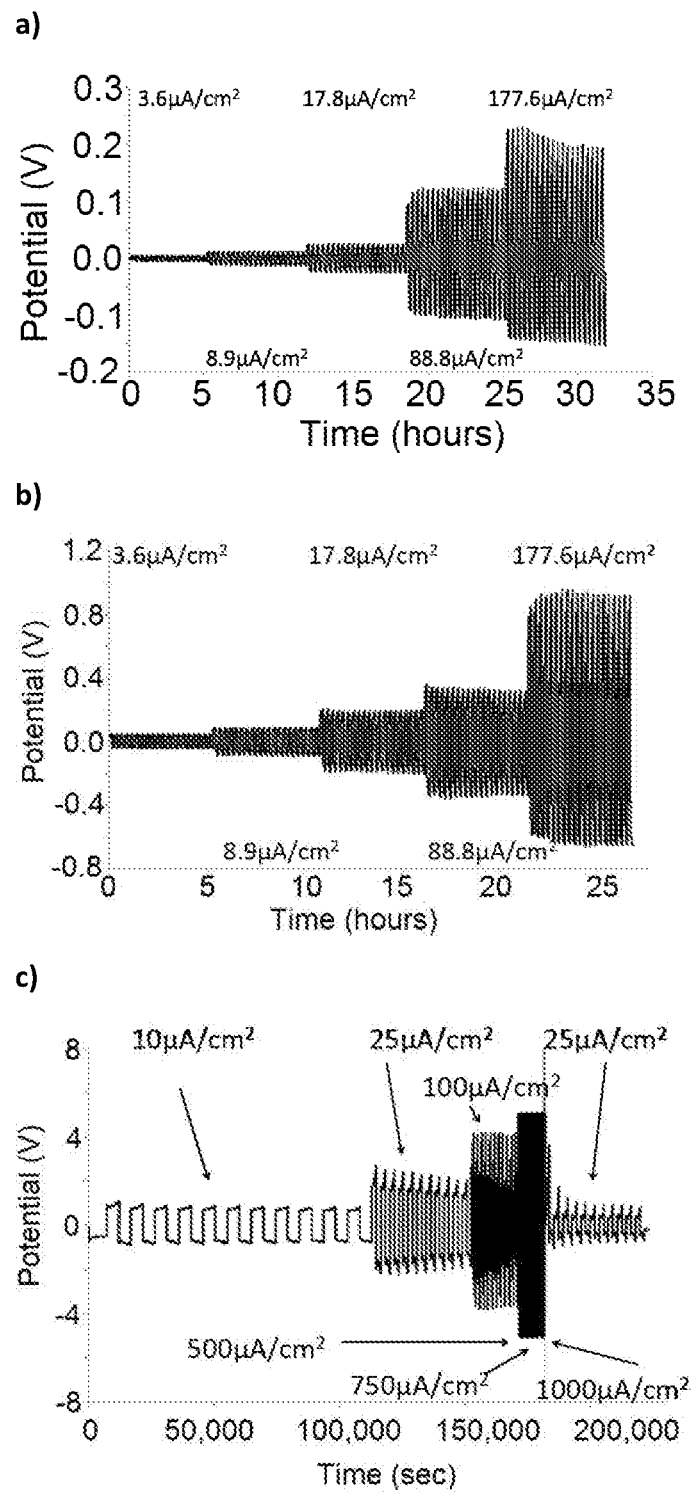
FIG. 8 shows electrochemical cycling data measured on a sodium symmetric cell (sodium electrodes) using $P_{111i4}$[TFSI]/Na[TFSI] electrolyte compositions with sodium concentration of 25 mol % and 50 mol %, at 25° C. and 50° C.

Data obtained from a symmetric sodium cell (sodium electrodes) using $P_{111i4}$[TFSI]/Na[TFSI] electrolyte compositions with 25 mol % and 50 mol % sodium is shown in FIG. 8.

The plot in FIG. 8(a) shows the time-dependent current cycling of the symmetric sodium cell using a $P_{111i4}$[TFSI]/Na[TFSI] electrolyte composition with 25 mol % sodium at 25° C. Charge/discharge current densities were varied from 1.77 µA/cm² to 177.2 µA/cm² with a step duration of 7 minutes. Cycling was performed at 25° C. The plot in FIG. 8(b) shows similar time-dependent current cycling of the same symmetric sodium cell measured at 50° C.

The plot in FIG. 8(c) shows the time-dependent current cycling of the symmetric sodium cell using a $P_{111i4}$[TFSI]/Na[TFSI] electrolyte composition with 50 mol % sodium. Charge/discharge current densities were varied from 10 µA/cm² to 1,000 µA/cm² with a time step adjusted to move a fixed quantity of charge at each current density (0.004 mAh). The cycling was performed at 25° C.

Example 7

Data obtained from a hybrid cell (sodium as negative electrode and carbon capacitor as positive electrode) using $P_{111i4}$[TFSI]/Na[TFSI] electrolyte compositions with 50 mol % sodium and operating at 25° C. is shown in FIG. 9.

The plot in FIG. 9(a, b) relates to current cycling data measured for the hybrid cell when a charge/discharge current density of 30 µA/cm² (17 mA/g) is applied between a voltage window of 2 V to 4V.

The plot in FIG. 9(c, d) relates to cycling data measured for the hybrid cell when a charge/discharge current density of 30 µA/cm² (17 mA/g) is applied between a voltage window of 3V to 5V.

Example 8

Data obtained from a hybrid cell (sodium as negative electrode and carbon capacitor as positive electrode) using a $P_{111i4}$[TFSI]/Na[TFSI] electrolyte composition with 50 mol % sodium and operating at 50° C. is shown in FIG. 10.

The plots in FIG. 10(a, b) relate to cycling data measured for the cell when the charge/discharge current density is varied from 75 µA/cm² to 375 µA/cm² (40 mA/g to 200 mA/g) between a voltage window of 2V to 4V.

The plots in FIG. 10(c, d) relate to cycling data measured for the cell using a charge/discharge current density of 380 µA/cm² (200 mA/g) between a voltage window of 2V to 4V for 100 successive cycles.

Example 9

Data obtained from a hybrid sodium/carbon capacitor cell (sodium as negative electrode and carbon capacitor as positive electrode) using a $P_{111i4}$[TFSI]/Na[TFSI] electrolyte composition with 75 mol % sodium and operating at 50° C. is shown in FIG. 11.

The plot in FIG. 11(a) relates to current cycling data measured for the cell when a charge/discharge current densities is varied from 75 µA/cm² to 375 µA/cm² (40 mA/g to 200 mA/g) between a voltage window of 2V to 4V. The data refers to a cycling measurement performed at 50° C.

The plot in FIG. 11(b) relates to current cycling data measured for the cell using a charge/discharge current density of 75 µA/cm² (40 mA/g) between a voltage window of 2V to 4V. The data refers to a cycling measurement performed at 50° C.

Example 10

Sodium Electrochemical Cell Using a $P_{1i444}$FSI/Na[FSI] Electrolyte Composition Triisobutyl(methyl)phosphonium bis(fluorosulfonyl) imide ($P_{1i444}$FSI, 50 ppm) was synthesized through an anion exchange between triisobutyl(methyl)phosphonium tosylate (Io-li-tec, >95%) and potassium bis(fluorosulfonyl)imide (Suzhou Fluolyte., 99.9%). An aliquot measuring 120 µL of electrolyte (above melt temperature) was used in each cell, with a concentration of 45 mol % and 90 mol % Na[FSI] within the $P_{1i444}$[FSI]. The neat IL and electrolytes were dried in vacuo at 60° C. for 72 h. Sodium foils (radius of 4.5 mm) were prepared from Na rods (Merck Millipore, under paraffin oil) which were pressed and polished under hexane (RCI Leabchem, 99%, 6 ppm) using a nylon brush. Hexane was dried via reflux using calcium hydride (Aldrich, 60% dispersion in mineral oil) overnight, then distilled, and kept over molecular sieves in the glovebox, eliminating moisture uptake. A polyethylene (gratiis, Lydall, 7P03A) or glass fiber separator was included to prevent short circuit.

The melting temperature of $P_{1i444}$[FSI]/Na[FSI] electrolyte compositions having a sodium concentration of 45 mol % and 90 mol % is 90° C. and 120° C., respectively. Thus, the $P_{1i444}$FSI/Na[FSI] electrolyte compositions present as a solid under all testing conditions described herein for cells using $P_{1i444}$[FSI]/Na[FSI].

Anode Testing

Stripping/plating cycling was conducted at 50° C. Cycling was carried out using a battery tester (Neware) or a SP200 potentiostat (Biologic) which includes a frequency response analyzer for electrochemical impedance spectroscopy (EIS). EIS was measured by applying an alternating current of 10 mV with a frequency range from 1 MHz to 10 mHz. All cycling experiments included duplicate cells for reproducibility.

Data shown for sodium symmetric cell cycling of a cell using a $P_{1i444}$[FSI]/Na[FSI] electrolyte composition with 90 mol % is shown in FIGS. 12-16.

FIG. 12 shows the cell being cycled at various current densities ranging from 0.1 to 1 mA/cm² at 25° C. (polarisation steps of 10 min or within the ±5 V instrument limit).

FIG. 13 shows the same cell being cycled for a period of 50 hours at 25° C. at a current density of 0.01 mA/cm² for 1 hour polarisation step durations.

FIGS. 14, 15 and 16 show data measured using the cell at higher temperature (50° C.).

FIG. 14 shows the 90 mol % system cycling at 50° C. at current densities ranging from 0.1 to 1 mA/cm² (polarisation steps of 10 min or within the ±5 V instrument limit).

FIG. 15 shows the same cell being cycled for a period of 50 hours at 50° C. at a current density of 0.01 mA/cm² for 1 hour polarisation step durations.

FIG. 17 shows sodium metal plating and stripping data measured on a sodium symmetrical cell (sodium electrodes) using a $P_{1i444}$[FSI]/Na[FSI] electrolyte composition with sodium concentration of 45 mol %, and comprising a polyethylene separator. The data was obtained at 0.5 mAcm⁻² for 1 h polarization over 12 cycles.

FIG. 18 shows discharge capacity values measured on a sodium ion cell using $NaFePO_4$ as positive electrode (cathode), sodium as anode material and a $P_{1i444}$[FSI]/Na[FSI] electrolyte composition with sodium concentration of 45 mol %. The data relates to a 1.75-4.0V polarisation at C/10, C/5, C/2, C/1 (50dC) current scan rates.

Example 11

$P_{1i444}$FSI was synthesised according to the previously described procedure (example 10). Microporous glass fibre separators (1.6 μm pore size and 260 μm thickness) were dried inside a vacuum oven at 100° C. overnight and then saturated with melted electrolyte. Na disc electrodes (9 mm diameter) were punched out of Na metal (Sigma) that had been stored under paraffin oil (Merck Millipore), rolled and then mechanically cleaned in hexane using a brush. Symmetrical Na|Na CR2032 coin cells were prepared by assembling the Na discs and saturated separator in a Hohsen coin cell crimper, using a 0.5 mm spacer and a 1.4 mm spring. The whole cell assembly procedure was performed inside an argon-filled glove box. Cells were stored at 50° C. for 24 hours before being cycled on a Multi Potentiostat VMP3/Z (Bio-Logic) and data were collected using EC-lab software version 10.38.

$P_{1i444}$[FSI]/Na[PF₆] electrolyte compositions present as a solid up to 25° C. for all sodium concentrations. Specifically, at any given sodium concentration the melting temperature of $P_{1i444}$[FSI]/Na[PF₆] electrolyte compositions is above 40° C. In particular, the melting temperature of the $P_{1.444}$[FSI]/Na[PF₆] electrolyte composition described in this example (i.e. having a sodium concentration of 20 mol %) is 47° C. Accordingly, the $P_{1i444}$[FSI]/Na[PF₆] electrolyte composition described in this example presents as a solid at all test conditions.

FIG. 19 shows galvanostatic cycling at 23° C. of a sodium symmetric cell (sodium electrodes) using a $P_{1i444}$[FSI]/Na[PF₆] electrolyte composition with sodium concentration of 20 mol %. The data was measured using a current density of 0.1 mAcm², at 10 and 30 minute intervals.

Example 12

Triisobutylmethylphosphonium tosylate ([1³$_{1i444}$]tosylate) (11.7 g, 30 mmol) was dissolved in 50 mL of distilled water and Lithium bis(trifluoromethanesulfonyl)amide (LiTFSI) (9.5 g, 33 mmol) was added and white precipitates formed instantaneously. The solution was stirred at room temperature two hours. The product was dissolved in 100 ml of $CHCl_3$, followed by washing with distilled water several times (7×50 mL). The organic solvent was removed in vacuo, to get the white solid of triisobutylmethylphosphonium bis(trifluoromethanesulfonyl)amide. The white solid was dried at 60° C. for 72 hours. Yield (14 g, 94%).

The melting temperature of 1)$_{1i444}$[TFSI]/Na[TFSI] electrolyte compositions is above 40° C. for all sodium concentrations. In particular, the melting temperature of a $P_{1i444}$[TFSI]/Na[TFSI] electrolyte compositions described in this example (i.e. having a sodium concentration of 50 mol %) is 175° C. Accordingly, the $P_{1i444}$[TFSI]/Na[TFSI] electrolyte composition described in this example presents as a solid at all test conditions.

FIG. 20 shows cycling data relative to a sodium symmetrical cell using a $P_{1i444}$[TFSI]/Na[TFSI] electrolyte composition with sodium concentration of 50 mol %, cycling at 0.05 mAcm⁻² for 30 min at 50° C.

Every formulation or combination of components described or exemplified can be used to practice the invention, unless otherwise stated. Specific names of compounds are intended to be exemplary, as it is known that one of ordinary skill in the art can name the same compounds differently.

Throughout this specification and the claims which follow, unless the context requires otherwise, the word 'comprise', and variations such as 'comprises' and 'comprising', will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A sodium-ion electrolyte composition for use in an electrochemical cell, the electrolyte composition comprising a mixture of a phosphonium salt and a sodium salt, wherein a sodium ion is present at a concentration of at least 25 mol % relative to the total moles of phosphonium salt and sodium salt combined, and the electrolyte composition presents as a solid up to at least 25° C.

2. The electrolyte composition of claim 1, wherein the electrolyte composition is solid throughout the entire composition.

3. The electrolyte composition of claim 1, wherein the phosphonium salt is a phosphonium-based organic ionic plastic crystal (OIPC).

4. The electrolyte composition of claim 3, wherein the phosphonium-based OIPC is selected from one or more of diethyl(methyl)(isobutyl)phosphonium bis(fluorosulfonyl)amide, diethyl(methyl)(isobutyl)phosphonium tetrafluoroborate, diethyl(methyl)(isobutyl)phosphonium hexafluorophosphate, methy(triethyl)phosphonium bis(fluorosulfonyl)amide, methyl(triethyl)phosphonium bis(trifluoromethyl sulfonyl)amide, triisobutyl(methyl)phosphonium hexafluorophosphate, triisobutyl(methyl)phosphonium bis(fluorosulfonyl)amide, triisobutyl(methyl)phosphonium tetrafluoroborate, triisobutyl(methyl)phosphonium thiocyanate, triethyl(methyl)phosphonium bis(fluorosulfonyl)imide, tri(isobutyl)phosphonium bis(trifluoromethanesulfonyl)amide, tri(isobutyl)phosphonium methanesulfonate, tri(isobutyl)phosphonium trifluoro-methanesulfonate, and tri(isobutyl)phosphonium nitrate.

5. The electrolyte composition of claim 1, wherein the sodium salt is selected from one or more of sodium bis(trifluoromethane)sulfonimide (Na[TFSI]), sodium (bis(fluorosulfonyl)imide (Na[FSI]), sodium triflate (NaOTf), sodium perchlorate (NaClO$_4$), sodium tetrafluoroborate (NaBF$_4$) and sodium hexafluorophosphate (NaPF$_6$).

6. The electrolyte composition of claim 1, wherein the electrolyte composition has ionic conductivity of at least $10^{-9}$ S/cm when in sub-melting phase.

7. A sodium electrochemical cell comprising a negative electrode and a sodium-ion electrolyte composition according to claim 1.

8. The cell of claim 7, wherein the cell supports a current density at the negative electrode of at least 10 μA/cm$^2$.

9. The cell of claim 7, wherein the cell supports a current density at the negative electrode of at least 10 μA/cm$^2$ for at least 10 polarisation cycles, thereby resulting in a charge transfer of at least 0.05 mAh/cm$^2$.

10. The cell of claim 7, wherein the cell supports a current density at the negative electrode of at least 1,000 μA/cm$^2$.

11. The cell of claim 7, wherein the negative electrode comprises sodium metal.

12. The cell of claim 7, wherein the negative electrode comprises a sodium/carbon composite.

13. The cell of claim 7, further comprising a counter electrode.

14. The cell of claim 7, further comprising a positive electrode.

15. The cell of claim 14, wherein the positive electrode is a capacitor.

16. A sodium rechargeable battery comprising a negative electrode, a positive electrode, and a sodium-ion electrolyte composition according to claim 1.

* * * * *